US011777206B2

(12) United States Patent
Zhu et al.

(10) Patent No.: US 11,777,206 B2
(45) Date of Patent: Oct. 3, 2023

(54) INITIALIZATION AND OPERATION OF INTELLIGENT REFLECTING SURFACE

(71) Applicant: Nokia Technologies Oy, Espoo (FI)

(72) Inventors: Qiping Zhu, Wheaton, IL (US);
Frederick Vook, Schaumburg, IL (US);
Nitin Mangalvedhe, Hoffman Estates, IL (US); Jun Tan, Glenview, IL (US);
William Hillery, Lafayette, IN (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/352,000

(22) Filed: Jun. 18, 2021

(65) Prior Publication Data

US 2022/0407222 A1 Dec. 22, 2022

(51) Int. Cl.
*H04B 7/02* (2018.01)
*H01Q 3/00* (2006.01)
(Continued)

(52) U.S. Cl.
CPC ............ *H01Q 3/005* (2013.01); *H01Q 3/38* (2013.01); *H04B 7/0417* (2013.01);
(Continued)

(58) Field of Classification Search
CPC ......... H01Q 3/005; H01Q 3/38; H04W 76/14; H04W 24/10; H04W 56/001; H04B 7/0417
(Continued)

(56) References Cited

U.S. PATENT DOCUMENTS

2018/0219604 A1 8/2018 Lu et al.
2019/0174337 A1 6/2019 Prasad et al.
(Continued)

FOREIGN PATENT DOCUMENTS

CN 111245492 A 6/2020
WO 2012/104425 A1 8/2012
(Continued)

OTHER PUBLICATIONS

Dang et al., "Joint Beamforming for Intelligent Reflecting Surface Aided Wireless Communication Using Statistical CSI", China Communications, vol. 17, No. 8, Aug. 2020, pp. 147-157.
(Continued)

*Primary Examiner* — Zewdu A Kassa
(74) *Attorney, Agent, or Firm* — SQUIRE PATTON BOGGS (US) LLP

(57) ABSTRACT

Systems, methods, apparatuses, and computer program products for initialization and operation of intelligent reflecting surface. The method may include transmitting a synchronization signal block burst to a reflection surface device. The method may also include receiving a first measurement report of the synchronization signal block burst received at the reflection surface device. The method may further include determining a transmit beam for a subsequent synchronization signal block burst based on a highest strength of signals in the synchronization signal block burst. In addition, the method may include receiving a second measurement report of the subsequent synchronization signal block burst. Further, the method may include determining an arrival angle of the subsequent synchronization signal block burst at the reflection surface device. The method may also include establishing a connection with the reflection surface device based on the transmit beam and the arrival angle.

21 Claims, 13 Drawing Sheets

(51) Int. Cl.
| | | |
|---|---|---|
| *H04W 76/14* | (2018.01) | |
| *H01Q 3/38* | (2006.01) | |
| *H04B 7/0417* | (2017.01) | |
| *H04W 24/10* | (2009.01) | |
| *H04W 56/00* | (2009.01) | |

(52) U.S. Cl.
CPC ......... *H04W 24/10* (2013.01); *H04W 56/001* (2013.01); *H04W 76/14* (2018.02)

(58) Field of Classification Search
USPC ........ 375/267, 261, 260, 259, 219, 295, 316
See application file for complete search history.

(56) References Cited

U.S. PATENT DOCUMENTS

| | | | |
|---|---|---|---|
| 2019/0199412 A1 | 6/2019 | Koskela et al. | |
| 2022/0077919 A1* | 3/2022 | Li | H04B 7/0617 |
| 2022/0216908 A1* | 7/2022 | Choi | H04B 7/145 |
| 2022/0231753 A1* | 7/2022 | Bengtsson | H04B 7/088 |

FOREIGN PATENT DOCUMENTS

| | | |
|---|---|---|
| WO | 2019/185137 A1 | 10/2019 |
| WO | 2020/254030 A1 | 12/2020 |

OTHER PUBLICATIONS

Qiao et al., "Secure Transmission for Intelligent Reflecting Surface-Assisted mmWave and Terahertz Systems", IEEE Wireless Communications Letters, vol. 9, No. 10, Oct. 2020, pp. 1743-1747.

Pan et al., "Multicell MIMO Communications Relying on Intelligent Reflecting Surfaces", IEEE Transactions on Wireless Communications, vol. 19, No. 8, Aug. 2020, pp. 1-18.

Wu et al., "Intelligent Reflecting Surface Enhanced Wireless Network: Joint Active and Passive Beamforming Design", IEEE Global Communications Conference (GLOBECOM), Dec. 9-13, 2018, 6 pages.

Mohamed et al., "Leveraging UAVs with Intelligent Reflecting Surfaces for Energy-Efficient Communications with Cell-Edge Users", IEEE International Conference on Communications Workshops (ICC Workshops), Jun. 7-11, 2020, 6 pages.

"3rd Generation Partnership Project; Technical Specification Group Radio Access Network; NR; Physical layer procedures for control (Release 16)", 3GPP TS 38.213, V16.3.0, Sep. 2020, pp. 1-179.

Ning et al., "Terahertz multi-user massive mimo with intelligent reflecting surface: Beam training and hybrid beamforming", arxiv, Jan. 14, 2021, pp. 1-16.

You et al., "Channel Estimation and Passive Beamforming for Intelligent Reflecting Surface: Discrete Phase Shift and Progressive Refinement", IEEE Journal on Selected Areas in Communications, vol. 38, No. 11, Nov. 2020, pp. 2604-2620.

"3rd Generation Partnership Project; Technical Specification Group Radio Access Network; NR; Physical layer measurements (Release 16)", 3GPP TS 38.215, V16.3.0, Sep. 2020, pp. 1-25.

Zheng et al., "Intelligent Reflecting Surface-Enhanced OFDM: Channel Estimation and Reflection Optimization", IEEE Wireless Communications Letters, vol. 9, No. 4, Apr. 2020, pp. 518-522.

"3rd Generation Partnership Project; Technical Specification Group Radio Access Network; NR; Physical layer procedures for data (Release 16)", 3GPP TS 38.214, V16.3.0, Sep. 2020, pp. 1-166.

"3rd Generation Partnership Project; Technical Specification Group Radio Access Network; NR; Physical channels and modulation (Release 16)", 3GPP TS 38.211 V16.3.0, Sep. 2020, pp. 1-133.

Yang et al., "Intelligent Reflecting Surface Meets OFDM: Protocol Design and Rate Maximization", IEEE Transactions on Communications, vol. 68, No. 7, Jul. 2020, pp. 4522-4535.

You et al., "Fast Beam Training for IRS-Assisted Multiuser Communications", IEEE Wireless Communications Letters, vol. 9, No. 11, Nov. 2020, pp. 1845-1849.

Jia et al., "High-Resolution Channel Estimation for Intelligent Reflecting Surface-Assisted MmWave Communications", IEEE 31st Annual International Symposium on Personal, Indoor and Mobile Radio Communications, Aug. 31-Sep. 3, 2020, 6 pages.

International Search Report and Written Opinion issued in corresponding International Application No. PCT/EP2022/066137 dated Sep. 30, 2022.

B. Ning et al., "Channel Estimation and Hybrid Beamforming for Reconfigurable Intelligent Surfaces Assisted THz Communications", 16 pages.

* cited by examiner

INITIALIZATION AND OPERATION OF INTELLIGENT REFLECTING SURFACE

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for initialization and operation of intelligent reflecting surface.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR technology and named NG-eNB when built on E-UTRAN radio.

SUMMARY

Some example embodiments may be directed to a method. The method may include receiving a plurality of synchronization signal blocks comprising a synchronization signal block burst from a network element. The method may also include processing a signal power measurement for each of the plurality of synchronization signal blocks. The method may further include transmitting a report based on the signal power measurement to the network element.

Other example embodiments may be directed to an apparatus. The apparatus may include at least one processor and at least one memory including computer program code. The at least one memory and computer program code may also be configured to, with the at least one processor, cause the apparatus at least to receive a plurality of synchronization signal blocks comprising a synchronization signal block burst from a network element. The apparatus may also be caused to process a signal power measurement for each of the plurality of synchronization signal blocks. The apparatus may further be caused to transmit a report based on the signal power measurement to the network element.

Other example embodiments may be directed to an apparatus. The apparatus may include means for receiving a plurality of synchronization signal blocks comprising a synchronization signal block burst from a network element. The apparatus may also include means for processing a signal power measurement for each of the plurality of synchronization signal blocks. The apparatus may further include means for transmitting a report based on the signal power measurement to the network element.

In accordance with other example embodiments, a non-transitory computer readable medium may be encoded with instructions that may, when executed in hardware, perform a method. The method may include receiving a plurality of synchronization signal blocks comprising a synchronization signal block burst from a network element. The method may also include processing a signal power measurement for each of the plurality of synchronization signal blocks. The method may further include transmitting a report based on the signal power measurement to the network element.

Other example embodiments may be directed to a computer program product that performs a method. The method may include receiving a plurality of synchronization signal blocks comprising a synchronization signal block burst from a network element. The method may also include processing a signal power measurement for each of the plurality of synchronization signal blocks. The method may further include transmitting a report based on the signal power measurement to the network element.

Other example embodiments may be directed to an apparatus that may include circuitry configured to receive a plurality of synchronization signal blocks comprising a synchronization signal block burst from a network element. The apparatus may also include circuitry configured to process a signal power measurement for each of the plurality of synchronization signal blocks. The apparatus may further include circuitry configured to transmit a report based on the signal power measurement to the network element.

Certain example embodiments may be directed to a method. The method may include transmitting a synchronization signal block signal burst to a reflection surface device. The method may also include receiving a first measurement report of the synchronization signal block signal burst received at the reflection surface device. The method may further include determining a transmit beam for a subsequent synchronization signal block signal burst based on a highest strength of signals in the synchronization signal block signal burst. In addition, the method may include receiving a second measurement report of the subsequent synchronization signal block signal burst. Further, the method may include determining an arrival angle of the subsequent synchronization signal block signal burst at the reflection surface device. The method may also include establishing a connection with the reflection surface device based on the transmit beam and the arrival angle.

Other example embodiments may be directed to an apparatus. The apparatus may include at least one processor and at least one memory including computer program code. The at least one memory and computer program code may be configured to, with the at least one processor, cause the apparatus at least to transmit a synchronization signal block burst to a reflection surface device. The apparatus may also be caused to receive a first measurement report of the synchronization signal block burst received at the reflection surface device. The apparatus may further be caused to determine a transmit beam for a subsequent synchronization signal block burst based on a highest strength of signals in the synchronization signal block burst. In addition, the apparatus may be caused to receive a second measurement report of the subsequent synchronization signal block burst.

Further, the apparatus may be caused to determine an arrival angle of the subsequent synchronization signal block burst at the reflection surface device. The apparatus may also be caused to establish a connection with the reflection surface device based on the transmit beam and the arrival angle.

Other example embodiments may be directed to an apparatus. The apparatus may include means for transmitting a synchronization signal block signal burst to a reflection surface device. The apparatus may also include means for receiving a first measurement report of the synchronization signal block signal burst received at the reflection surface device. The apparatus may further include means for determining a transmit beam for a subsequent synchronization signal block signal burst based on a highest strength of signals in the synchronization signal block signal burst. In addition, the apparatus may include means for receiving a second measurement report of the subsequent synchronization signal block signal burst. Further, the apparatus may include means for determining an arrival angle of the subsequent synchronization signal block signal burst at the reflection surface device. The apparatus may also include means for establishing a connection with the reflection surface device based on the transmit beam and the arrival angle.

In accordance with other example embodiments, a non-transitory computer readable medium may be encoded with instructions that may, when executed in hardware, perform a method. The method may include transmitting a synchronization signal block signal burst to a reflection surface device. The method may also include receiving a first measurement report of the synchronization signal block signal burst received at the reflection surface device. The method may further include determining a transmit beam for a subsequent synchronization signal block signal burst based on a highest strength of signals in the synchronization signal block signal burst. In addition, the method may include receiving a second measurement report of the subsequent synchronization signal block signal burst. Further, the method may include determining an arrival angle of the subsequent synchronization signal block signal burst at the reflection surface device. The method may also include establishing a connection with the reflection surface device based on the transmit beam and the arrival angle.

Other example embodiments may be directed to a computer program product that performs a method. The method may include transmitting a synchronization signal block signal burst to a reflection surface device. The method may also include receiving a first measurement report of the synchronization signal block signal burst received at the reflection surface device. The method may further include determining a transmit beam for a subsequent synchronization signal block signal burst based on a highest strength of signals in the synchronization signal block signal burst. In addition, the method may include receiving a second measurement report of the subsequent synchronization signal block signal burst. Further, the method may include determining an arrival angle of the subsequent synchronization signal block signal burst at the reflection surface device. The method may also include establishing a connection with the reflection surface device based on the transmit beam and the arrival angle.

Other example embodiments may be directed to an apparatus that may include circuitry configured to transmit a synchronization signal block burst to a reflection surface device. The apparatus may also include circuitry configured to receive a first measurement report of the synchronization signal block burst received at the reflection surface device. The apparatus may further include circuitry configured to determine a transmit beam for a subsequent synchronization signal block burst based on a highest strength of signals in the synchronization signal block burst. In addition, the apparatus may include circuitry configured to receive a second measurement report of the subsequent synchronization signal block burst. Further, the apparatus may include circuitry configured to determine an arrival angle of the subsequent synchronization signal block burst at the reflection surface device. The apparatus may also include circuitry configured to establish a connection with the reflection surface device based on the transmit beam and the arrival angle.

Some example embodiments may be directed to a method. The method may include receiving configuration from a network element comprising a set of phase shift settings, or accessing the set of phase shift settings from storage. The method may also include receiving a synchronization signal block burst based on a transmit beam exhibiting a highest signal power out of a plurality of transmit beams. The method may further include applying apply a phase shift setting from the set of phase shift settings to a plurality of reflecting elements. In addition, the method may include reflecting a synchronization signal block to a reference user equipment based on the applied phase shift setting.

Other example embodiments may be directed to an apparatus. The apparatus may include at least one processor and at least one memory including computer program code. The at least one memory and computer program code may also be configured to, with the at least one processor, cause the apparatus at least to receive configuration from a network element comprising a set of phase shift settings, or access the set of phase shift settings from storage. The apparatus may also be caused to receive a synchronization signal block burst based on a transmit beam exhibiting a highest signal power out of a plurality of transmit beams. The apparatus may further be caused to apply a phase shift setting from the set of phase shift settings to a plurality of reflecting elements. In addition, the apparatus may be caused to reflect a synchronization signal block to a reference user equipment based on the applied phase shift setting.

Other example embodiments may be directed to an apparatus. The apparatus may include means for measuring, at the apparatus, a radio altimeter signal. The apparatus may also include means for receiving configuration from a network element comprising a set of phase shift settings, or access the set of phase shift settings from storage. The apparatus may also include means for receiving a synchronization signal block burst based on a transmit beam exhibiting a highest signal power out of a plurality of transmit beams. The apparatus may further include means for applying a phase shift setting from the set of phase shift settings to a plurality of reflecting elements. In addition, the apparatus may include means for reflecting a synchronization signal block to a reference user equipment based on the applied phase shift setting.

In accordance with other example embodiments, a non-transitory computer readable medium may be encoded with instructions that may, when executed in hardware, perform a method. The method may include receiving configuration from a network element comprising a set of phase shift settings, or accessing the set of phase shift settings from storage. The method may also include receiving a synchronization signal block burst based on a transmit beam exhibiting a highest signal power out of a plurality of transmit beams. The method may further include applying apply a phase shift setting from the set of phase shift settings to a plurality of reflecting elements. In addition, the method may include reflecting a synchronization signal block to a reference user equipment based on the applied phase shift setting.

Other example embodiments may be directed to a computer program product that performs a method. The method may include receiving configuration from a network element comprising a set of phase shift settings, or accessing the set of phase shift settings from storage. The method may also include receiving a synchronization signal block burst based on a transmit beam exhibiting a highest signal power out of a plurality of transmit beams. The method may further include applying apply a phase shift setting from the set of phase shift settings to a plurality of reflecting elements. In addition, the method may include reflecting a synchronization signal block to a reference user equipment based on the applied phase shift setting.

Other example embodiments may be directed to an apparatus that may include circuitry configured to receive configuration from a network element comprising a set of phase shift settings, or access the set of phase shift settings from storage. The apparatus may also include circuitry configured to receive a synchronization signal block burst based on a transmit beam exhibiting a highest signal power out of a plurality of transmit beams. The apparatus may further include circuitry configured to apply a phase shift setting from the set of phase shift settings to a plurality of reflecting elements. In addition, the apparatus may include circuitry configured to reflect a synchronization signal block to a reference user equipment based on the applied phase shift setting.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for initialization and operation of intelligent reflecting surface.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

An intelligent reflecting surface (IRS) is a planar surface including many passive reflecting elements, each of which may be able to independently induce a controllable amplitude and/or phase change to the incident signal. By deploying IRSs in a wireless network and smartly coordinating their reflections, the signal propagation/wireless channels between transmitters and receivers can be flexibly reconfigured to achieve desired realizations. As such, it may be possible to provide ways for addressing wireless channel fading impairment and interference issues.

A design of the passive reflecting element may be based on low-cost printed dipoles, which do not require any transmit or receive radio-frequency chains, and therefore the IRS can be operated/implemented with orders-of-magnitude lower hardware/energy cost compared to traditional active antenna arrays. With the passive reflecting property, an IRS may operate in full-duplex (FD) mode, and may be free of antenna noise amplification as well as self-interference, which thus offers competitive advantages over traditional active FD relay/integrated access and backhaul (IAB).

Figure 1:
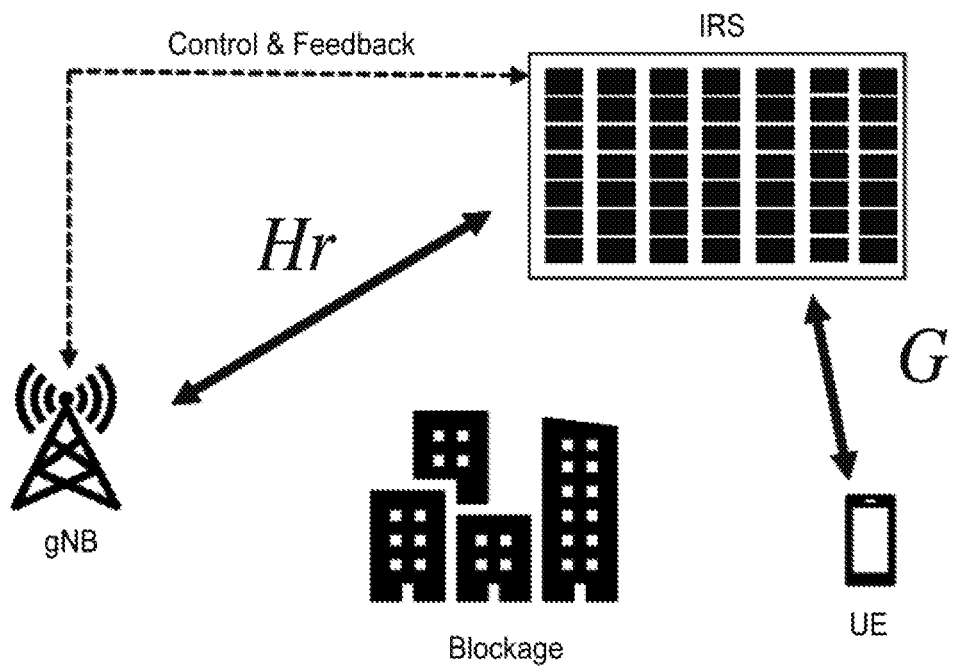
FIG. 1 illustrates an example of intelligent reflecting surface-assisted (IRS-assisted) wireless communications.

FIG. 1 illustrates an example of IRS-assisted wireless communications. In particular, the example of FIG. 1 illustrates IRS-assisted wireless communications for extending coverage over blockage. For instance, a situation may be assumed where a line-of-sight (LOS) channel between the gNB and the desired user equipment (UE) is blocked. Then with an IRS, a reflection link (gNB-IRS-UE) can be established through tuning the phase shifts in the reflecting elements (RE) of the IRS such that signals from the gNB can be reflected to the desired UE direction and signals from UE can be reflected in the direction of the gNB. Therefore, even without a LOS channel, a sustainable and reliable connection can still be established between the gNB and the desired UE. The potential use cases of IRS may also include, but are not limited to, enhancing channel quality (i.e., channel rank) and changing the channel statistics (i.e., interference control).

In another situation, the signal from the transmitting source may be blocked by obstacles. For example, this may be a common problem at millimeter-wave frequencies and above. In this case, the IRS may be placed strategically in the environment to provide coverage extension or blockage mitigation. In the latter case, outdoor-to-indoor penetration loss may cause coverage problems for indoor UEs. Taking advantage of the fact that a signal passing through a window may experience a minor loss, an IRS may be deployed inside and near the window to capture signal energy and reflect it towards the UE.

Figure 2:
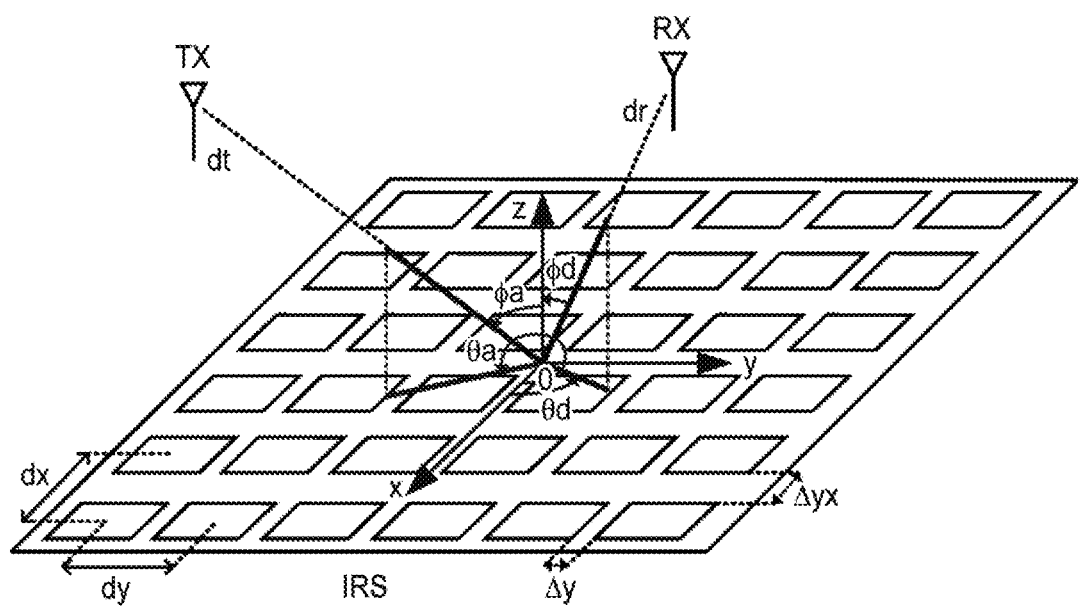
FIG. 2 illustrates an example intelligent reflecting surface (IRS) geometry.

FIG. 2 illustrates an example IRS geometry. In particular, FIG. 2 illustrates a rectangular planar IRS with N×M reflecting elements where the azimuth angle is denoted as θ and the vertical angle is denoted as φ. For each reflecting element, the impedance may be designed to realize the reflection coefficient $\beta e^{j\gamma}$, where $\beta \in [0,1]$ is the controllable amplitude gain, and $\gamma \in [0,2\pi]$ is the controllable phase shift. The separation between the center of adjacent reflecting elements (REs) is denoted by $d_x$ and $d_y$ along two orthogonal axes on the IRS plane, $d_t$ is the distance from the mid-point on the IRS to the transmitter (TX), and $d_r$ is the distance from the mid-point on the IRS to the receiver (RX).

The received power considering a single-input single-output (SISO) free-space channel path loss function of IRS can be modeled as equation (1) as follows:

$$P_r = P_t G \left| \sum_{n=1-\frac{N}{2}}^{N/2} \sum_{m=1-\frac{M}{2}}^{M/2} G_{n,m} \beta_{n,m} e^{\frac{-j2\pi(r^t_{n,m}+r^r_{n,m})}{\lambda} + j\gamma_{n,m}} \right|^2$$

In equation (1), $P_t$ is the transmit power, and G is the channel gain, which is proportional to antenna gains, RE area, and wavelength. Further, $G_{n,m}$ is related to the power radiation patterns on the received signal power, and $\beta_{n,m}$ and $\gamma_{n,m}$ are the reconfigurable amplitude and phase in RE (n, m), respectively. In addition, $r_{n,m}^t$ is the distance from RE (n, m) to the transmitter and $r_{n,m}^r$ is the distance from RE (n, m) to the receiver.

More specifically, $r_{n,m}^t$ is given by equation (2) as follows:

$$r^t_{n,m} = \sqrt{\left(d_t\sin(\phi_a)\cos(\theta_a) - \left(m-\frac{1}{2}\right)d_x\right)^2 + \left(d_t\sin(\phi_a)\sin(\theta_a) - \left(n-\frac{1}{2}\right)d_y\right)^2 + (d_t\cos(\phi_a))^2} \approx$$

$$d_t - \sin(\phi_a)\cos(\theta_a)\left(m-\frac{1}{2}\right)d_x - \sin(\phi_a)\sin(\theta_a)\left(n-\frac{1}{2}\right)d_y,$$

and $r_{n,m}^r$ is given by equation (3) as follows:

$$r^r_{n,m} = \sqrt{\left(d_r\sin(\phi_d)\cos(\theta_d) - \left(m-\frac{1}{2}\right)d_x\right)^2 + \left(d_r\sin(\phi_d)\sin(\theta_d) - \left(n-\frac{1}{2}\right)d_y\right)^2 + (d_r\cos(\phi_d))^2} \approx$$

$$d_r - \sin(\phi_d)\cos(\theta_d)\left(m-\frac{1}{2}\right)d_x - \sin(\phi_d)\sin(\theta_d)\left(n-\frac{1}{2}\right)d_y.$$

To maximize the received power $P_r$, $\gamma_{n,m}$ can be designed as equation (4) as follows:

$$\gamma_{n,m} = \vartheta_{x,n} + \vartheta_{y,m}$$

where $$\vartheta_{x,n} = \mathrm{mod}\left(-\frac{2\pi d_x n(\sin(\phi_a)\cos(\theta_a) - \sin(\phi_d)\cos(\theta_d))}{\lambda}\right)_{2\pi},$$

$$\vartheta_{y,m} = \mathrm{mod}\left(-\frac{2\pi d_y m(\sin(\phi_a)\sin(\theta_a) - \sin(\phi_d)\sin(\theta_d))}{\lambda}\right)_{2\pi}.$$

The above equations may imply that if $\phi_a$, $\theta_a$, $\phi_d$, $\theta_d$ are known to the gNB, it can calculate the values $\vartheta_{x,n}$, $\vartheta_{y,m}$ to maximize the power of the signals transmitted by the gNB that are received by the UE when the signals arrive at the IRS from the gNB at angles $\phi_a$, $\theta_a$, and depart from (i.e., are reflected by) the IRS towards the UE at angles $\phi_d$, $\theta_d$. The gNB may then control the IRS to configure the phase shifts $\vartheta_{x,n}$, $\vartheta_{y,m}$. In certain cases, the control may be performed through a wired or wireless interface between the gNB and the IRS.

Since $\phi_a$, $\theta_a$, $\phi_d$, $\theta_d$ are independent, it may be possible to obtain: $\sin(\phi_a)\cos(\theta_a) - \sin(\phi_d)\cos(\theta_d) \in [-2, 2]$, $\sin(\phi_a)\sin(\theta_a) - \sin(\phi_d)\sin(\theta_d) \in [-2, 2]$. One way to determine the arrival and/or departure angles may be through configuring different angles from a codebook. For example, the codebook can be based on uniform construction. That is, defining a step $\Delta$, the uniform codebook for the phase control values $\vartheta_{x,n}$, $\vartheta_{y,m}$ of each reflecting element may be constructed as $\mathcal{B}=[-2, -2+\Delta, \ldots, 2-\Delta, 2]$ where $\Delta$ depends on the resolution of the phase control in reflecting elements. For a given pair of arrival angles $\{\phi_a, \theta_a\}$, different pairs of departure angles $\{\phi_d, \theta_d\}$ may be determined to obtain each of the values in the codebook $\mathcal{B}$ and vice versa.

Figure 3:
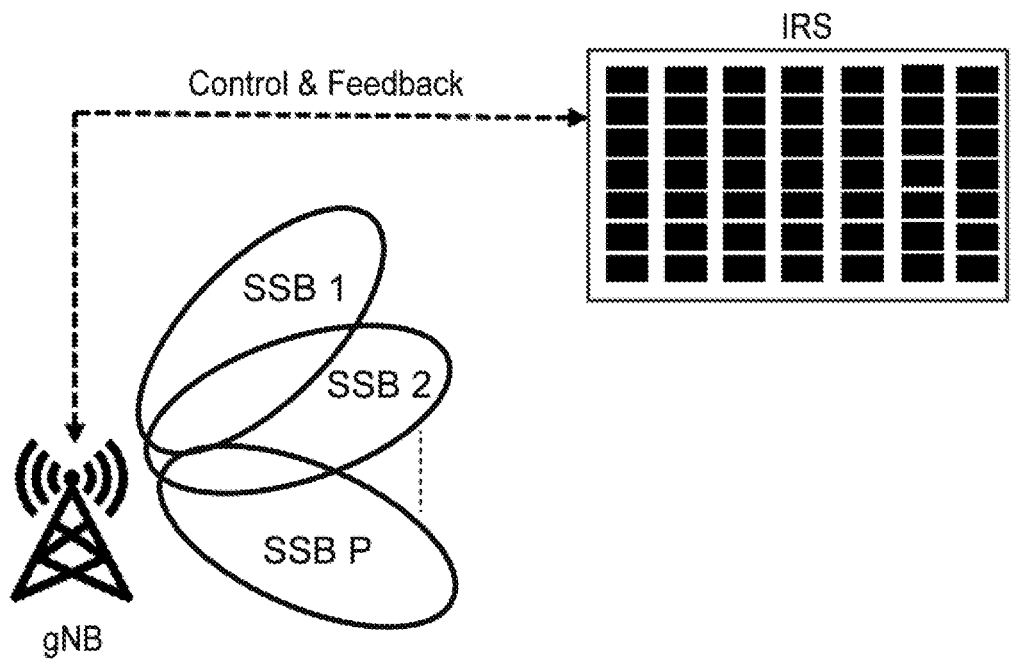
FIG. 3 illustrates an example of determining the best beam transmitted by the gNB and received at the IRS.

Certain cases may consider an NR system with a gNB and an IRS placed strategically in the environment to provide coverage extension or blockage mitigation. To build up the connection between a gNB and a UE with the IRS, the gNB may acquire certain information from $H_r$ and G. For instance, FIG. 3 illustrates an example of determining the best beam transmitted by the gNB and received at the IRS. Alternatively, obtaining only the spatial domain information (beam directions) of the channels may reduce the channel estimation overhead. With this approach, for the gNB to correctly configure the IRS to reflect the signals from the gNB towards a UE, the gNB may determine the arrival angles $\{\phi_a, \theta_a\}$, and the departure angles $\mathcal{B}\{\phi_d, \theta_d\}$. Thus, from the gNB's perspective, certain problems may be solved including, for example, determining the best beam transmitted by the gNB and arriving at the IRS, determining the arrival angles (azimuth and vertical) of signals transmitted by the gNB on the best beam at the IRS, and determining the best departure angles of the reflected signals from the IRS towards the UE.

Figure 4:
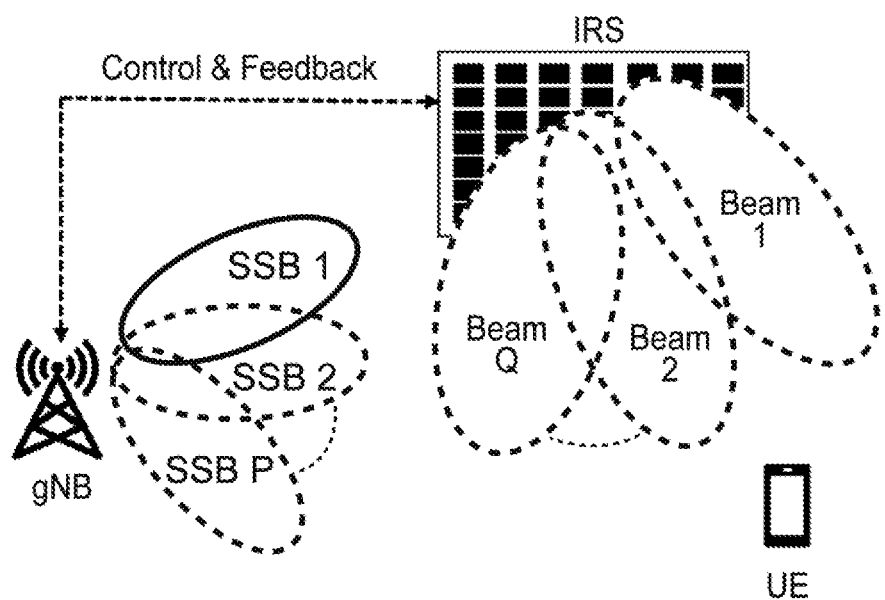
FIG. 4 illustrates an example of determining the best departure angle from the IRS on a reflected beam, according to certain example embodiments.

FIG. 4 illustrates an example of determining the best departure angle from the IRS on a reflected beam, according to certain example embodiments. Certain example embodiments may provide a solution to determining the best departure angles of the reflected signals from the IRS towards the UE based on, for example, RSRP measurements for different departure angles configured for the IRS. Therefore, in certain example embodiments, it may be assumed that the gNB has already determined the best beam among P beams transmitted by the gNB and arriving at the IRS. Furthermore, the arrival angles $(\phi_a, \theta_a)$ of this beam at the IRS may also be assumed to be known. The gNB may determine the best departure angles $(\phi_d, \theta_d)$ corresponding to one of Q candidate reflected "beams" as shown in FIG. 4. In certain example embodiments, the best departure angle may be an angle that maximizes the received power described in equation (1), which is what the subsequent equations described herein, and the associated explanations address. As noted above in some example embodiments, RSRP may be used to determine the best angles.

In some cases, in order to coherently decode the signals over the reflection link (RL), the gNB and the UE may acquire a certain level of channel information for the RL. However, it may not be realistic to accurately estimate the full channel state information (CSI) of the RL in a practical implementation. For example, given that the IRS may have M×N REs, then for a SISO narrow band system (a single antenna at the gNB and a single antenna at the UE), MN channel taps may be estimated for coherent signal decoding. For a multiple input multiple output (MIMO) narrow band system ($M_{gNB}$ antennas at gNB and $N_{UE}$ antennas at UE), $M_{gNB}MNN_{UE}$ channel taps may be estimated. Considering that a passive IRS may be equipped with a large number of REs to provide enough antenna gain (beam gain) to compensate for the path loss and $M_{gNB}$ at the gNB may also be relatively large for a high band frequency system (millimeter wave band and Terahertz band), therefore, acquiring the full CSI of the RL may introduce a large overhead.

To reduce the channel acquisition overhead for the reflecting channel, one method may be to cluster the REs into subgroups and estimate one effective channel for each subgroup. Another method may be to acquire the beam space information of the RL instead of the full CSI of the RL, a method which may be adopted in the 5G NR system. For the downlink, the necessary beam space information of the RL for the gNB to perform coherent decoding may include one or more of the best departure angles at the gNB for transmit beams to the IRS, the best arrival angles at the IRS for receiving the best transmit beams from the gNB, and the best departure angles at the IRS for reflecting beams to the desired UE. Certain example embodiments described herein may provide a solution to the best departure angles and the best arrival angles noted above.

Certain methods may be based on utilizing uplink reference signals for gNB to sense the product of $H_r$ and G. This kind of method may introduce a large overhead for channel training. The NR beam management procedure may include transmission of reference signals (SSBs or CSI-RSs) by the gNB on different beams and reporting back by the UE of the best beam(s) based on measurement of the reference signals.

During initial access, the UE may determine the best SSB beam that it receives based on, for example, RSRP measurements on all candidate SSBs and perform random access where the random access channel (RACH) occasion provides an implicit indication to the gNB of the best beam due to the association between SSBs and the RACH occasion, as signaled in the RACH configuration. This procedure is defined for direct links between the gNB and the UE. An embodiment can build on this procedure for the case where additional reference signals are transmitted by the gNB to enable the UE to identify the best reflected beam.

Certain example embodiments may provide a method based on utilizing SSBs transmitted by the gNB. This solution may be transparent to the UE and may be implemented if the sum of the P beams transmitted by the gNB and the desired Q different departure angles at the IRS does not exceed the maximum allowed number of SSBs N. If P+Q>N.

Certain example embodiments may assume that the gNB has already determined the best SSB beam arriving at the IRS and the corresponding arrival angles $\phi_a = \Phi_{SSB}, \theta_a = \Theta_{SSB}$ to be assumed when configuring the phase shifts at the IRS for different departure angles for downlink communication. In addition, certain example embodiments may provide a method for the gNB to determine the best departure angles for reflecting transmissions from the gNB towards a UE with the capability to be supported by an IRS. In certain example embodiments, this may be achieved by configuring different departure angles for successively transmitted reference signals that are reflected by the IRS and monitored by the UE.

Given an IRS-assisted wireless communications system, certain example embodiments may provide a solution for a gNB to acquire beam space information for the channel between the gNB and the IRS. Certain example embodiments may also utilize the reference UEs (rUEs) in the system to receive and measure CSI signals and report the corresponding measurements, i.e. L1-RSRP. In some example embodiments, with the reported CSI information, the gNB may determine the best departure angles at the gNB for transmitting beams to the IRS and the best arrival angles at the IRS for receiving signals from the gNB.

In certain example embodiments, the gNB may transmit different SSBs each with a uniquely mapped spatial filter (beam), and the rUE may measure the corresponding L1-RSRPs. The measured gNB signal strength at the rUE may be considered a good reference to represent the gNB signal strength received by the IRS (e.g., when the rUE is located close to the IRS). The rUE may feed back the measured data to the gNB and the best transmit beam from the gNB to the IRS may be computed based on the strongest received signal strength at the rUE.

According to certain example embodiments, to determine the best arrival angle at the IRS corresponding to the best transmit beam from the gNB, the gNB may configure the IRS with a set of phase shift settings based on a pre-designed codebook. Each phase shift setting may be associated with one pair of angles of arrival (e.g., azimuth and vertical) and one pair of angles of departure (e.g., azimuth and vertical). The departure angles in these settings may be the same, and may point to a second rUE (for which the departure angles are known). Additionally, the arrival angles in each setting may be different, and may be designed to sweep the selected arrival angle space at the IRS. In other example embodiments, the best transmit beam at the gNB may be determined by transmitting a different SSB on each beam. Further each beam may have a different departure angle, and the best transmit beam from the gNB may be the one on which the corresponding SSB is received by the rUE with the highest power.

In certain example embodiments, in each subsequent SSB block that is associated with the best transmit beam from the gNB to the IRS, the IRS may apply one phase shift setting to the REs and reflect the SSB to the pre-selected rUE. The rUE may measure the corresponding L1-RSRP and feed back the information to the gNB on a reverse path via a reflection at the IRS or via a dedicated wireless or wired feedback interface. Based on the L1-RSRP reports associated with different arrival angles at the IRS, the gNB can compute the best arrival angle at the IRS with the strongest L1-RSRP of the SSB that is associated with the best transmit beam from the gNB to the IRS.

In certain example embodiments, it may be assumed that the gNB has already determined the best beam for transmitting to the IRS along with the corresponding arrival angles at the IRS $\phi_a = \Phi_{SSB}$, $\theta_a = \Theta_{SSB}$ to be assumed when configuring the phase shifts at the IRS for different departure angles for downlink communication. To transmit along a particular departure direction relative to the IRS, the gNB may transmit with the best beam for the IRS, and the IRS may be configured with the phase shifts that take the signals arriving from the corresponding arrival angle at the IRS, and reflect those signals along the desired departure direction relative to the IRS.

Certain example embodiments may also provide a method for the gNB to leverage an IRS for transmitting to and receiving from a UE. A UE may either be served by a beam directly transmitted from the gNB (e.g., the UE is not blocked to the gNB and the IRS provides no benefits), or the UE may be served by a transmission that leverages the IRS (e.g., the UE is blocked to the gNB and can receive the energy reflected by the IRS).

Additionally, certain example embodiments may leverage a procedure similar to beam sweeping in which the gNB may transmit signals either with a direct beam (IRS disabled), or the beam for the IRS while the IRS is configured to sweep out departure directions relative to the IRS. In other words, for multiple successive transmissions, the IRS in certain example embodiments may be configured to reflect energy along a set of different departure directions relative to the IRS. Existing CSI feedback methods (e.g., RACH, SSBRI, CRI) may be used to determine which transmission method is preferred (i.e., whether a direct beam is best or whether one of the IRS departure directions is preferred).

According to certain example embodiments, the IRS may be initialized for operation, which may involve determining the best beam from the gNB to the IRS, and the arrival angle at the IRS of the best beam between the gNB and the IRS. In other example embodiments, the gNB may be configured to use P "direct" beams to cover the cell. The direct beams may be beams that transmit/receive information to/from the gNB without using the IRS (i.e., the IRS is disabled. Additionally, the IRS may be configured to create Q "reflected" beam directions to extend the coverage of the cell. In certain example embodiments, when using each of the Q reflected beams, the gNB may transmit on the best beam for the IRS, and the IRS may be configured to maximally reflect the energy from the gNB along one of the corresponding Q directions with respect to the IRS.

In certain example embodiments, for transmission of SSBs, an SSB burst may be partitioned into a set of P SSBs that are transmitted along the P direct beams, and a set of Q SSBs that are transmitted along the Q reflected beams. The UE may not need to be aware of whether an SSB is transmitted along a direct beam or a reflected beam. In other example embodiments, the UE may receive the SSB burst and select which of the SSBs is the best. An indicator of the best SSB may be provided to the gNB (either through the RACH mechanism or through synchronization signal block resource indicator (SSBRI) feedback). This indication corresponding to a reflected beam may be sent on the reverse path via a reflection at the IRS.

According to certain example embodiments, during transmission of the indication corresponding to a reflected beam, the IRS may be configured to receive signals from that same direction and reflect them toward the gNB. In other example embodiments, when transmitting other signals/channels to the UE, the gNB may use either a direct beam (IRS off) or a reflected beam (IRS configured to reflect along a particular departure angle from the IRS). Furthermore, when receiving other signals/channels from one or more UEs, the gNB may use either a direct beam (IRS off) or a reflected beam (IRS configured to reflect energy to the gNB), also depending on the aforementioned indications (RACH or SSBRI). Certain example embodiments may also be extended to leverage CSI-RS transmissions in addition to or instead of the SSB transmissions. For instance, a CSI-RS resource set may be transmitted with either a direct beam or a reflected beam, and CRI feedback may be provided from the UE to pick which CSI-RS resource is the best among the set of CSI-RS resources.

Certain example embodiments may provide a system integrated with reference rUEs. The rUEs may be used to receive CSI signals from the gNB, process the corresponding measurements (i.e. L1-RSRP), and transmit the measured information back to the gNB. The rUEs may also be connected to the IRS via a wireless or wired interface. In some example embodiments, if the rUEs are connected to the IRS, then the measured CSI information may be transmitted to the gNB through the feedback and control link between the gNB and the IRS. Thus, in certain example embodiments, the rUEs may be implemented with RF receive circuits. If the rUEs are not connected to IRS, the capability to transmit signals to the gNB may be needed.

According to certain example embodiments, there may be a connection between the gNB and the implemented IRS (denoted as feedback and control link). The feedback and control link may be used for the gNB to transmit phase control signals $\{\gamma_{n,m}\}$ for the REs in the IRS, and for the IRS or rUEs to transmit CSI measurement related information to the gNB.

According to other example embodiments, there may be provided a means for initializing the IRS. For example, in certain example embodiments, the gNB may transmit SSB burst signals periodically. The gNB may also use different spatial filters (beam) over different SSB blocks in the SSB burst.

Figure 5:
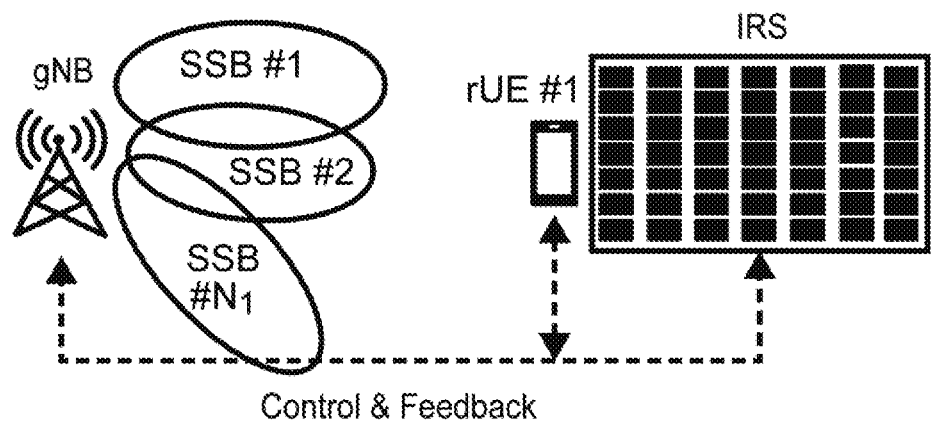
FIG. 5 illustrates an example UE measuring a layer 1 reference signal received power (L1-RSRP) of synchronization signal blocks (SSBs) from the gNB, according to certain example embodiments.

FIG. 5 illustrates an example rUE measuring an L1-RSRP of SSB blocks from the gNB, according to certain example embodiments. As illustrated in FIG. 5, one of the rUEs (rUE #1) may be located in a position that shares the same azimuth and vertical arrival angles at IRS with respect to the impinging signals from the gNB (rUE #1 can be implemented inside the IRS or outside the IRS). Further, rUE #1 may receive the SSB burst signals, and measure the L1-RSRP of each SSB block. In addition, rUE #1 or the IRS may transmit the measured L1-RSRP values back to the gNB. In certain example embodiments, the gNB may determine the SSB set $\mathcal{B} = \{SSB_i\}$ based on the largest $l \geq 1$ reported L1-RSRP values ($SSB_i$ is the SSB with index i, where l defined in a higher layer). The index of $SSB_i \in$ $\mathcal{B}$ may uniquely map to the transmitted spatial filter at the gNB, and may represent the best departure angles at the gNB for transmit beams to the IRS. In some example embodiments, instead of rUE #1 transmitting all the measured L1-RSRP values to the gNB, one alternative may be that rUE #1 determines $\mathcal{B}=\{SSB_i\}$ and transmits the index of each $SSB_i \in \mathcal{B}$ (all the SSB-indexes in $\mathcal{B}$) back to the gNB.

In certain example embodiments, l=1 to simplify the procedure in the following step. In particular, according to certain example embodiments, another rUE, rUE #2, may be integrated in the system with its location known to the gNB (e.g., if rUE #1 is implemented in a position outside the IRS then rUE #1 can be reused as rUE #2 depending on the practical implementation). In addition, the gNB may know the best departure azimuth and vertical angles $(\theta_d, \phi_d)$ at the IRS for the channels between the IRS and rUE #2. After the gNB obtains B, in the subsequent SSB burst signals, for each $SSB_i \in \mathcal{B}$, the gNB may indicate different phase settings $\{\gamma_{n,m}\}$ to configure the REs in the IRS such that the departure angles $(\theta_d, \phi_d)$ at the IRS point to rUE #2 for all the phase settings while the arrival angles $(\theta_a, \phi_a)$ at the IRS may be varied for different phase settings. In other words, each $SSB_i \in \mathcal{B}$ in different SSB bursts may be associated with a phase setting in the IRS that has the same departure angle $(\theta_d, \phi_d)$ but different arrival angles $(\theta_{a_{i,j}}, \phi_{a_{i,j}})$. Such example embodiments may make it possible to find the best arrival angles at the IRS for the signals from the gNB.

Figure 6:
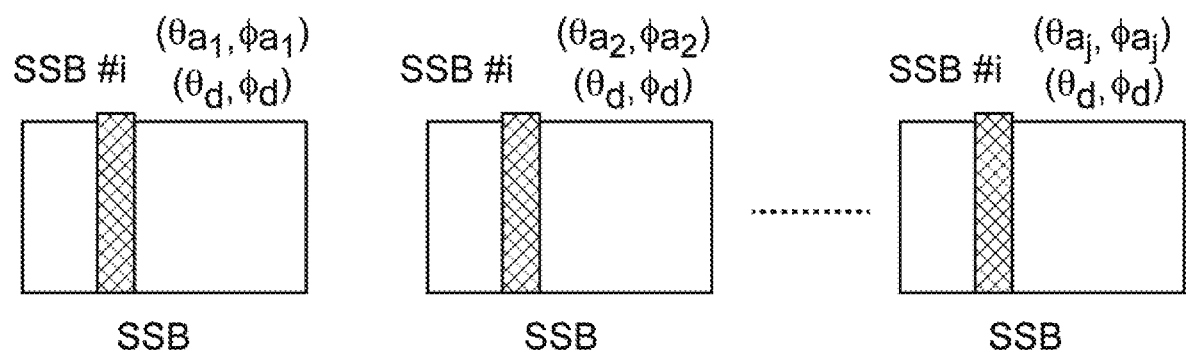
FIG. 6 illustrates an example association between SSB i and the configured angles, according to certain example embodiments.

FIG. 6 illustrates an example association between SSBi and the configured angles, according to certain example embodiments. In particular, FIG. 6 illustrates the association between $SSB_i \in \mathcal{B}$ and $(\theta_d, \phi_d), (\theta_{a_{i,j}}, \phi_{a_{i,j}})$. If the LOS channel exists between gNB and IRS, then all of $SSB_i \in \mathcal{B}$ may share the same best azimuth and vertical arrival angles in the IRS. However, if NLOS channels exist between the gNB and IRS, then different $SSB_i \in \mathcal{B}$ may share different best azimuth and vertical arrival angles in IRS.

Figure 7:
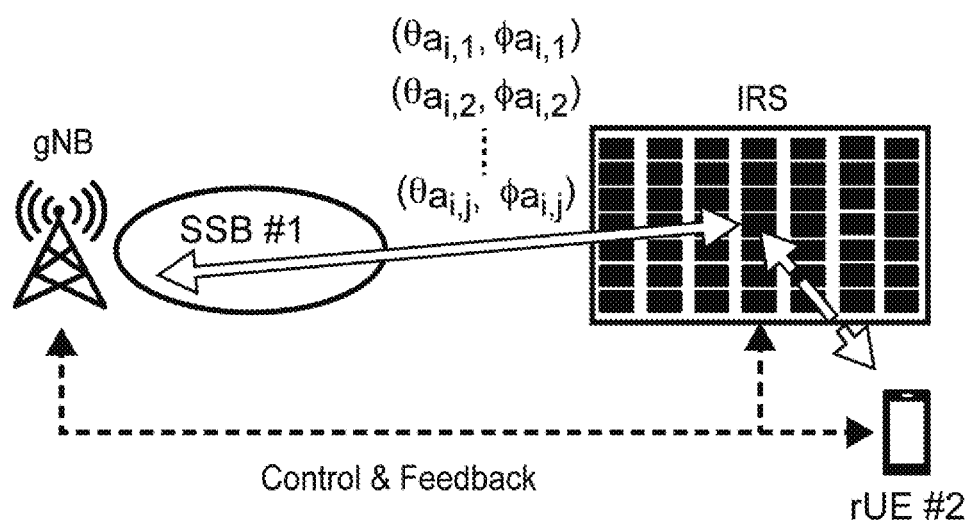
FIG. 7 illustrates rUE #2 measuring L1-RSRP of SSB i, according to certain example embodiments.

FIG. 7 illustrates rUE #2 measuring L1-RSRP of $SSB_i$, according to certain example embodiments. In particular, as illustrated in FIG. 7, rUE #2 may be configured to measure the L1-RSRP of $SSB_i \in \mathcal{B}$, and transmit the corresponding L1-RSRP information back to the gNB. Since this transmission is sent back on the reverse path via the IRS, for receiving a measurement report at the gNB from rUE #2 corresponding to arrival angles $(\theta_{a_j}, \phi_{a_j})$, the phase setting in the IRS may be configured for arrival angles $(\theta_d, \phi_d)$ and departure angles $(\theta_{a_j}, \phi_{a_j})$. Alternatively, the measurement report from rUE #2 may be sent to the gNB on a dedicated wireless or wired feedback interface. FIG. 7 also illustrates that the gNB may collect the feedback information and compute the best arrival angles set $\mathcal{M}=\{\mathcal{M}_i\}$ and $\mathcal{M}_i=\{\theta_{a_{i,j}}, \phi_{a_{i,j}}\}$ for the IRS to receive $\mathcal{B}=\{SSB_i\}$. With the information in $\mathcal{M}$ and $\mathcal{B}$, the initialization which establishes the connection between the gNB and the IRS may be complete.

According to certain example embodiments, since positions of the gNB and the IRS may be static, the channel angle information may not change dramatically over a relatively long period of time. Thus, the periodicity of repeating the IRS initialization may be set to be large enough to reduce overhead.

Figure 8:
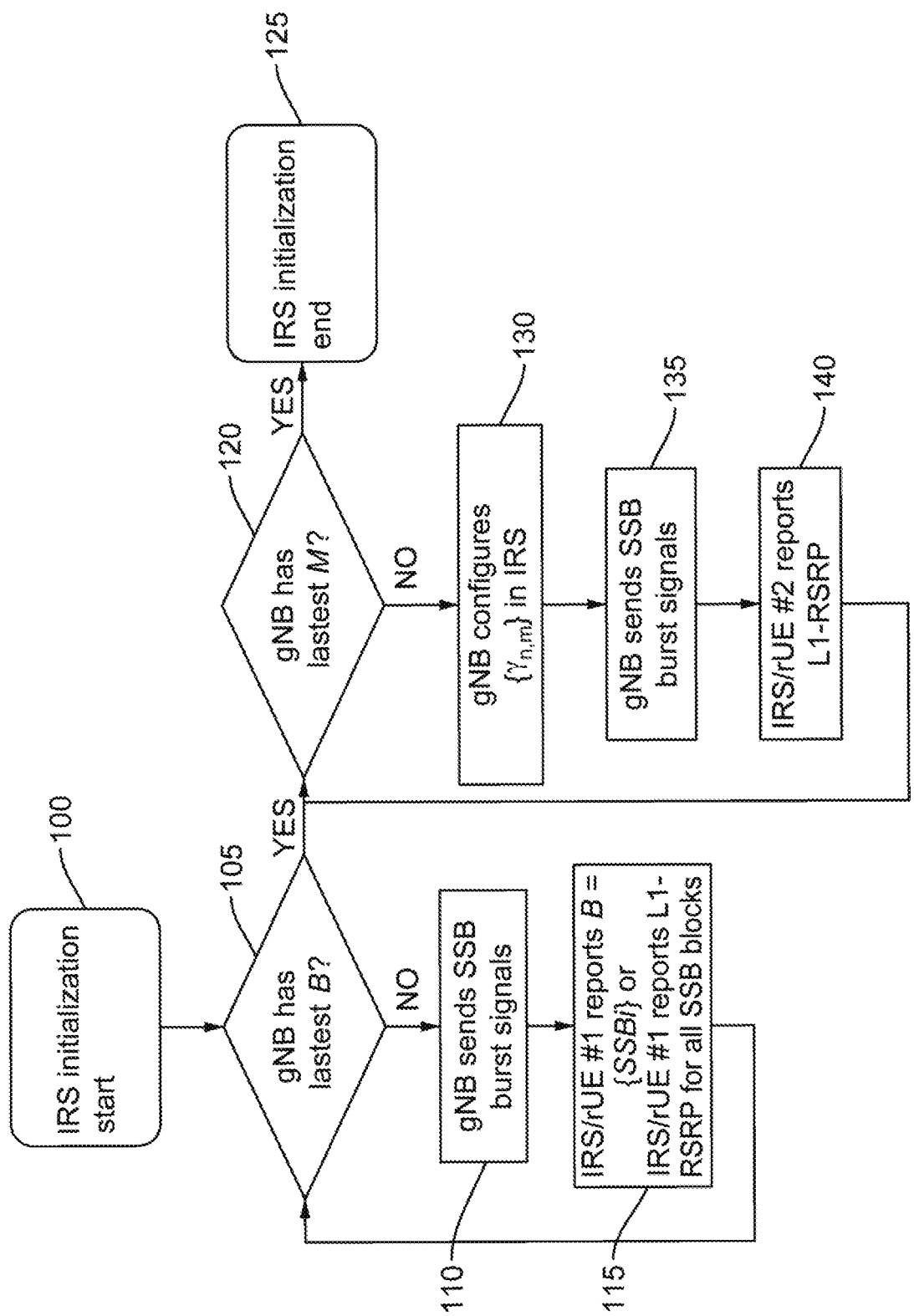
FIG. 8 illustrates example IRS initialization method, according to certain example embodiments.

FIG. 8 illustrates a flow diagram of an example IRS initialization method, according to certain example embodiments. In particular, as illustrated in the example of FIG. 8, the IRS initialization may start at 100. At 105, a determination may be made at the gNB whether the gNB has the latest SSB set. If gNB does not have the SSB set or its SSB set is outdated according to certain rules at 110, the gNB may send SSB burst signals to rUE #1. At 115, rUE #1 may receive the SSB and measure the L1-RSRP of each SSB block, and rUE #1 or the IRS may transmit a report of the measured L1-RSRP values back to the gNB. Alternatively, the IRS or rUE #1 may report the SSB-indexes back to the gNB. The rules for gNB to determine whether the SSB set is outdated may be based on a pre-defined expiration time for a SSB set or based on the IRS reported beam measurement after it is connected to gNB.

If at 105 it is determined that the gNB has the latest SSB set, a determination may be made at 120 as to whether the gNB has the latest arrival angles set $\mathcal{M}$. If yes, the IRS initialization may end at 125. If gNB does not have the arrival angles set $\mathcal{M}$ or its arrival angles set $\mathcal{M}$ is outdated according to certain rules, the gNB may, at 130, configure the phase settings in the IRS. Once configured, at 135, the gNB may send SSB burst signals to rUE #2. At 140, the IRS or rUE #2 may report L1-RSRP measurements of the SSB burst signals to the gNB. The rules for gNB to determine whether the arrival angles set $\mathcal{M}$ is outdated may be based on a pre-determined expiration time for ana arrival angles set $\mathcal{M}$ or based on the IRS reported beam measurement after it is connected to gNB.

According to certain example embodiments, a gNB supporting IRS-based communication may enable support for the IRS by configuring some of the SSBs for IRS support (that are termed IRS-SSBs) and turning on transmissions of the IRS-SSBs. Likewise, the gNB may disable support for the IRS by turning off IRS-SSB transmissions. When the gNB disables support for the IRS, the IRS may be turned off and behave like any other reflecting surface, without the ability to focus reflections of an incident signal in any particular direction. In other example embodiments, the gNB may dynamically turn off the IRS, for example, when it is transmitting SSBs or other signals that are not required to be reflected by the IRS (e.g., transmitted with direct beams).

Figure 9:
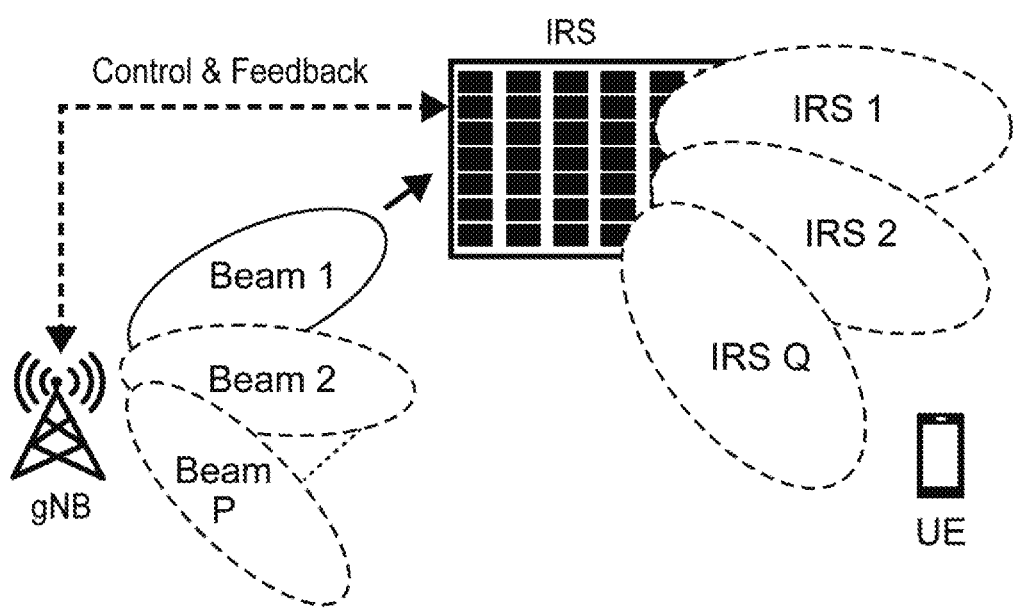
FIG. 9 illustrates an example IRS configured to reflect IRS-SSBs of a burst set received from the gNB at different departure angles, according to certain example embodiments.

FIG. 9 illustrates an example IRS configured to reflect IRS-SSBs of a burst set received from the gNB at different departure angles, according to certain example embodiments. As illustrated in the example of FIG. 9, an antenna array at the gNB may be configured with a set of P beam directions (i.e., beams that are aimed in P different directions from the gNB). According to certain example embodiments, it may be assumed that beam 1 is the best beam for transmitting to the IRS (best beam out of the set of P beam directions for delivering power to the IRS). It may also be assumed that the arrival angle to the IRS from beam 1 has already been determined.

According to certain example embodiments, the IRS may be configured with a set of Q IRS reflected beam directions, for example, directions of departure from the IRS. In certain example embodiments, each IRS reflected beam may be configured to maximally reflect along a particular departure direction. In addition, the energy that arrives at the IRS at the arrival angle may correspond to the best beam from the gNB (beam 1). According to some example embodiments, the phases that drive the reflecting elements that create an IRS reflected beam may be calculated based on the arrival angle from gNB beam 1 and the desired departure angle for the IRS reflected beam. In addition, "codebook" containing Q sets of phases may be created to capture the phases that may be applied to the IRS for each of the Q IRS reflected beam directions.

Figure 10A:
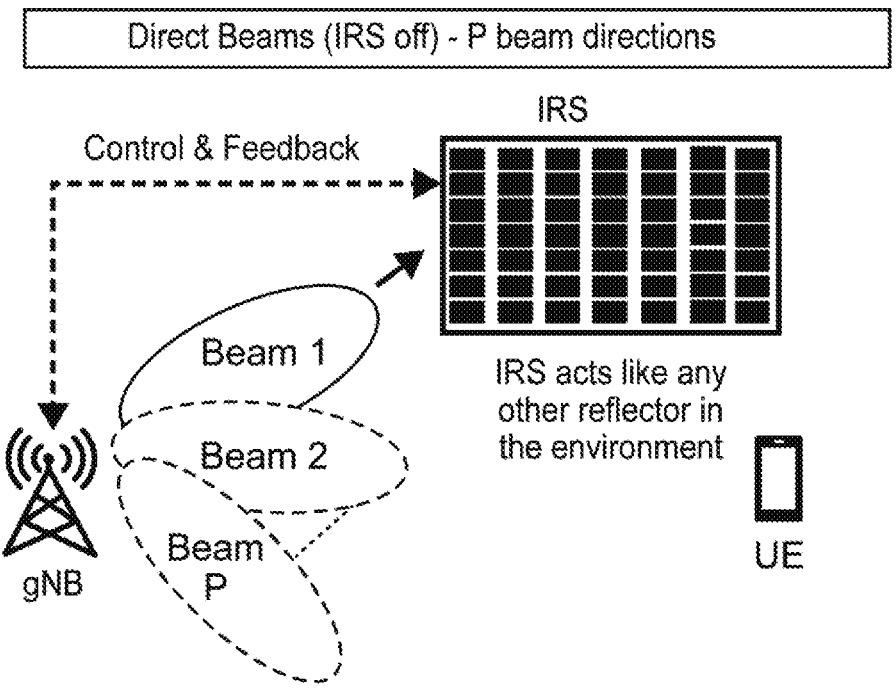
FIG. 10(a) illustrates an example of P direct beams when the IRS is turned off, according to certain example embodiments.
Figure 10B:
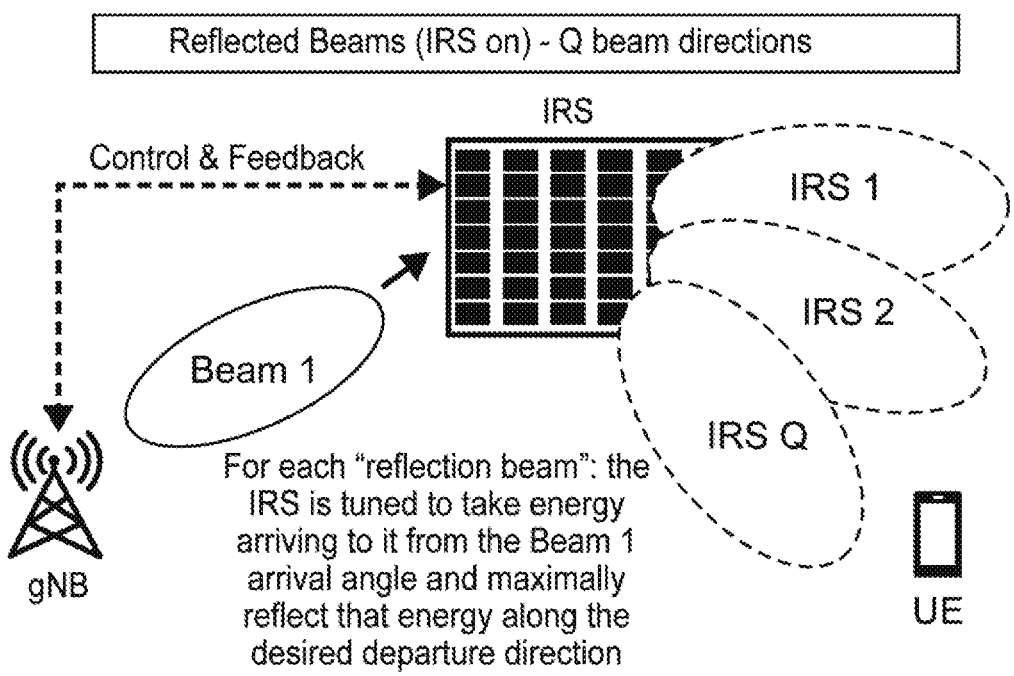
FIG. 10(b) illustrates an example of Q reflected beams when the IRS is turned on, according to certain example embodiments.

FIG. 10(a) illustrates an example of P direct beams when the IRS is turned off, according to certain example embodiments. Further, FIG. 10(b) illustrates an example of Q reflected beams when the IRS is turned on, according to certain example embodiments. In certain example embodiments, the gNB may transmit information to a UE along one of the P beam directions. Alternatively, the gNB may leverage the IRS to transmit information along one of the Q IRS reflected beam directions. According to certain example embodiments, for simplification, two types of "beams" that are created to transmit information to the cell may be defined. For instance, a direct beam(s) may be defined, where the beams may be used to create the P beam directions may be referred to as direct beams, and may be used to transmit information to the cell with the IRS disabled (FIG. 10(a)). Certain example embodiments may assume that when the IRS is disabled, the IRS acts as any nominal reflective surface in the environment. In other words, there may be no active steering of any of the incident energy (FIG. 10(b)).

Another type of beam(s) that may be defined are reflected beams. Here, the gNB may leverage the IRS to transmit energy along one of the Q directions of departure from the IRS. For transmission on the qth reflected beam (q=1 . . . Q), the gNB may transmit energy along beam 1 (the best beam for transmitting to the IRS) while the IRS is configured to reflect energy maximally along the qth direction of departure relative to the IRS as illustrated in FIG. 10(a).

According to certain example embodiments, the operation of the system may be configured so that the UE does not need to know whether a beam that is used on the downlink is a direct beam or a reflected beam. This type of operation may therefore be transparent to the UE. In addition, another type of downlink signal or channel may be transmitted by either a direct beam or a reflected beam (e.g., SSB, CSI-RS, PDCCH, PDSCH, etc.).

In certain example embodiments, the gNB may receive information along one of the P beam directions or one of the Q reflected beam directions. In some example embodiments, when receiving information along the qth reflected beam, the IRS may be tuned to take the energy received along the direction corresponding to the qth reflected beam and reflect that energy towards the angle corresponding to the direction of gNB beam 1 relative to the IRS (i.e., best gNB beam towards the IRS). Thus, the concept of a direct beam and a reflected beam may apply equally to both transmit and receive.

Figure 11A:
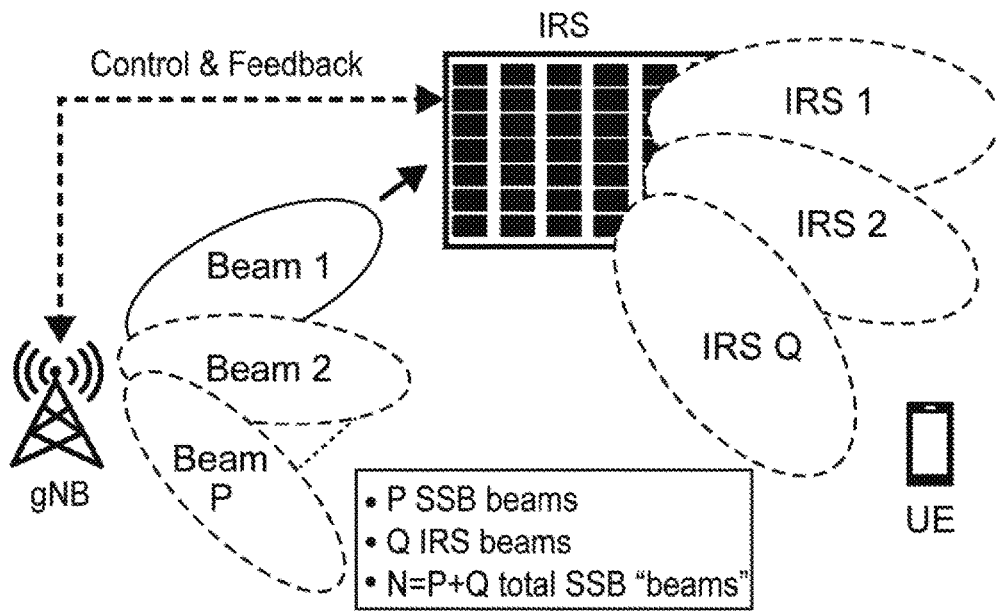
FIG. 11(a) illustrates an example SSB transmission pattern, according to certain example embodiments.
Figure 11B:
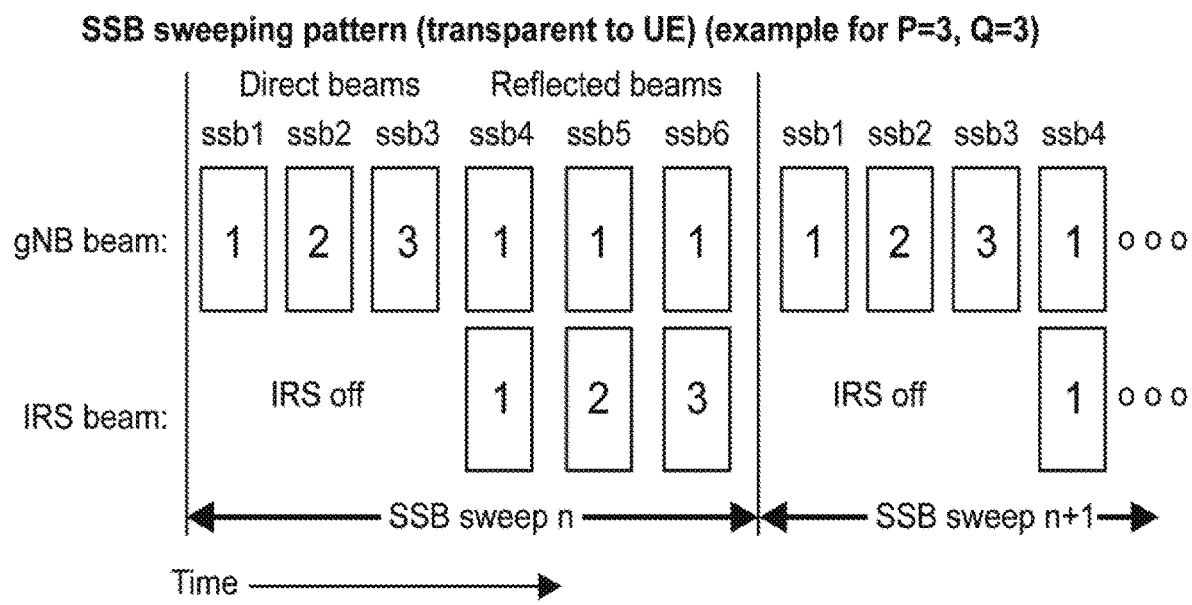
FIG. 11(b) illustrates an example SSB sweeping pattern, according to certain example embodiments.

FIG. 11(a) illustrates an example SSB transmission pattern, according to certain example embodiments. Further, FIG. 11(b) illustrates an example SSB sweeping pattern, according to certain example embodiments. In particular, for initial access into a system that leverages an IRS, FIGS. 11(a) and (b) illustrate an example for configuring an SSB burst, where a simplified SSB burst pattern is shown. The SSBs in the SSB burst may be divided into P=3 SSBs that are transmitted with direct beams and Q=3 SSBs that are transmitted with reflected beams. As illustrated in the examples of FIGS. 11(a) and (b), SSB1, SSB2, and SSB3 may be transmitted with direct beams 1 through 3 respectively while the IRS is disabled. According to certain example embodiments, SSB4, SSB5, and SSB6 may be transmitted with reflected beams, where the gNB transmits with beam 1 (i.e., the best beam for the IRS) while the IRS is configured for reflected departure directions 1, 2, and 3 respectively relative to the IRS. The timeline showing the six SSBs may repeat for subsequent SSB bursts.

According to certain example embodiments, the RACH configuration may define the association between RACH occasion and SSBs such that the there is a unique RACH occasion corresponding to each SSB. Thus, when a UE performs random access using the RACH occasion corresponding to an SSB that was transmitted over a reflected beam, this may provide an implicit and unambiguous indication to the gNB that the UE has determined a reflected beam is the best beam. Similarly, when the UE performs random access using the RACH occasion corresponding to an SSB that was transmitted over a direct beam, this may provide an implicit and unambiguous indication to the gNB that the UE has determined a direct beam is the best beam.

Figure 12:
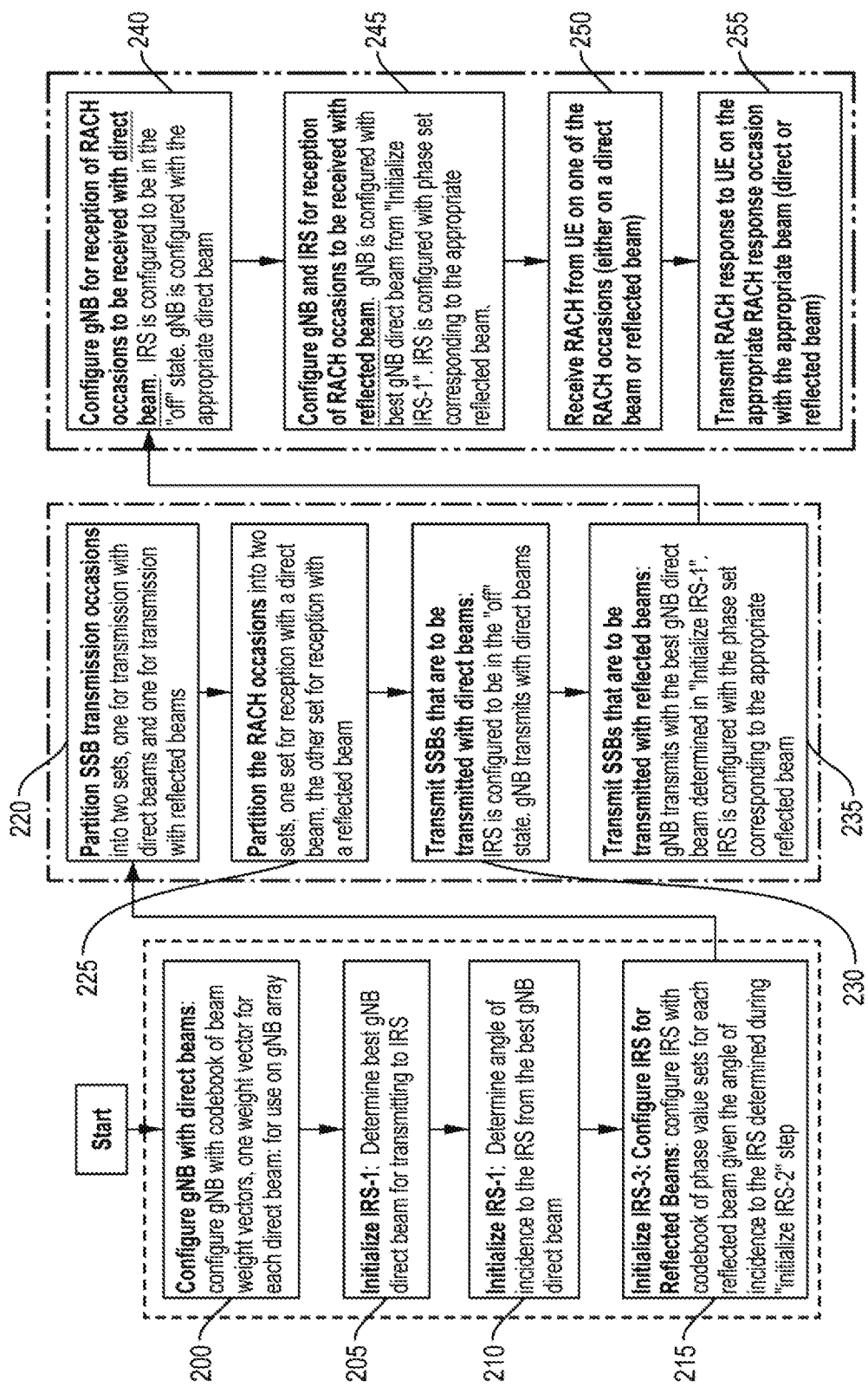
FIG. 12 illustrates an example flow diagram of a gNB operation, according to certain example embodiments.

FIG. 12 illustrates an example flow diagram of a gNB operation, according to certain example embodiments. In particular, the example of FIG. 12 illustrates a gNB operation for determining the departure angles at the IRS for DL transmission to a UE using IRS-SSBs. FIG. 12 further illustrates operations for an initial access leveraging an IRS in NR. The operations illustrated in the example of FIG. 12 may relate to initialization operations (200, 205, 210, and 215), operations of transmitting the SSBs (220, 225, 230, and 235), and operations involved with receiving the RACH occasions (240, 245, 250, and 255).

As illustrated in the example of FIG. 12, at 200, the gNB may be configured with direct beams. For instance, the gNB may be configured with codebook beam vectors, one weight vector for each direct beam for use on a gNB array. At 205, the gNB may determine the best gNB direct beam for transmitting to the IRS. At 210, the gNB may determine an angle of incidence to the IRS from the best gNB direct beam. At 215, the gNB may configure the IRS with a codebook of phase value sets for each reflected beam given the angle of incidence to the IRS determined during 210.

At 220, the gNB may partition SSB transmission occasions into two sets; one for transmission with direct beams, and one for transmission with reflected beams. At 225, the gNB may partition the RACH occasions in to two sets, one set for reception with a direct beam, and another set for reception with a reflected beam. At 230, the gNB may transmit SSBs that are to be transmitted with direct beams. Here, the IRS may be configured to be in the "off" state, and the gNB may transmit the SSBs with direct beams. At 235, the gNB may transmit SSBs with reflected beams. Here, the gNB may transmit with the best gNB direct beam determined at 205. In addition, the IRS may be configured with the phase set corresponding to the appropriate reflected beam.

As further illustrated in the example of FIG. 12, at 240, the gNB may be configured for reception of RACH occasions to be received with direct beam(s). Here, the IRS may be configured to be in the "off" state, and the gNB may be configured with the appropriate direct beam. At 245, the gNB and the IRS may be configured for reception of RACH occasions to be received with reflected beam(s). In some example embodiments, the gNB may be configured with the best gNB direct beam from 205, and the IRS may be configured with a phase set corresponding to the appropriate reflected beam. At 250, the gNB may receive RACH from the UE on one of the RACH occasions (either on a direct beam or a reflected beam). At 255, the gNB may transmit a RACH response to the UE on the appropriate RACH response occasion with the appropriate beam (direct or reflected beam).

Figure 13:
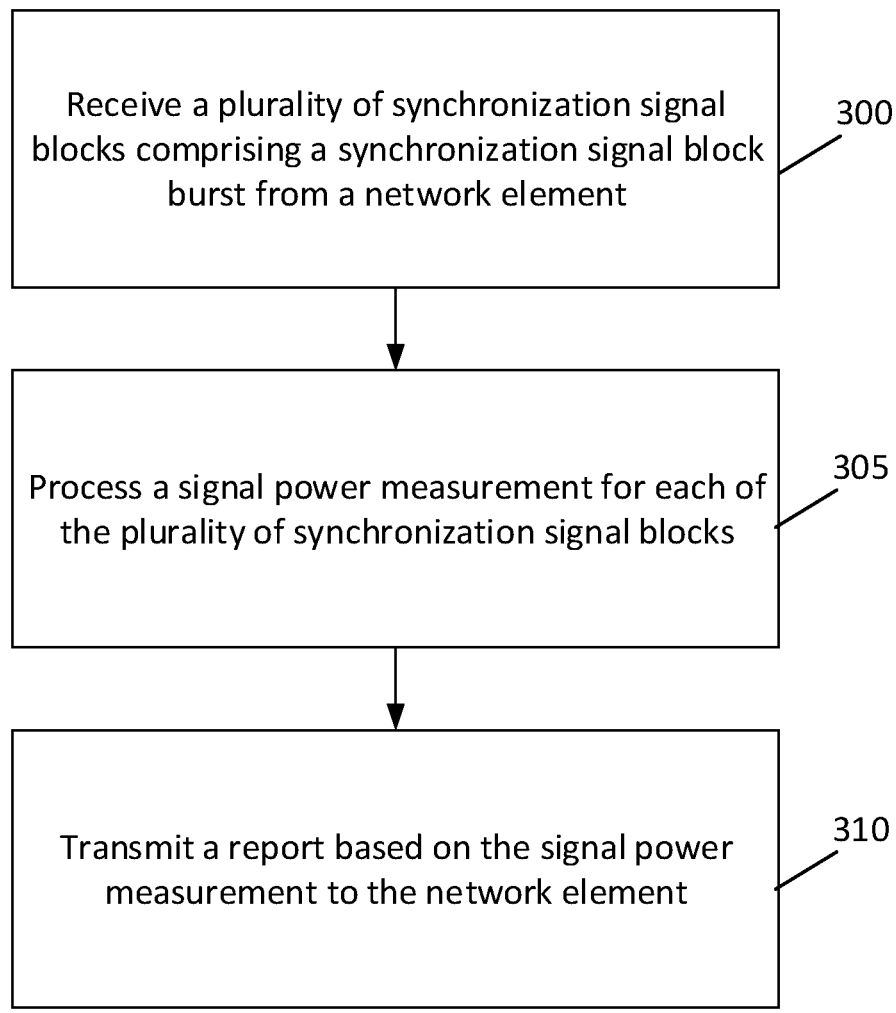
FIG. 13 illustrates an example flow diagram of a method, according to certain example embodiments.

FIG. 13 illustrates an example flow diagram of a method, according to certain example embodiments. In an example embodiment, the method of FIG. 13 may be performed by a network entity, network node, or a group of multiple network elements in a 3GPP system, such as LTE or 5G-NR. For instance, in an example embodiment, the method of FIG. 13 may be performed by a UE or rUE, for instance, similar to apparatuses 10 or 20 illustrated in FIGS. 16(a) and 16(b).

According to certain example embodiments, the method of FIG. 13 may include, at 300, receiving a plurality of synchronization signal blocks comprising a synchronization signal block burst from a network element. At 305, the method may include processing a signal power measurement for each of the plurality of synchronization signal blocks. At 310, the method may include transmitting a report based on the signal power measurement to the network element.

According to certain example embodiments, the at least one signal power measurement may correspond to a layer 1 reference signal power of a synchronization signal block of the plurality synchronization signal blocks. According to other example embodiments, the report may include a measurement report of the synchronization signal block burst based on the signal power measurement. In certain example embodiments, the method may also include determining a synchronization signal block set based on at least the highest reported signal power measurement. In other example embodiments, the report may include information relating to the synchronization signal block set.

Figure 14:
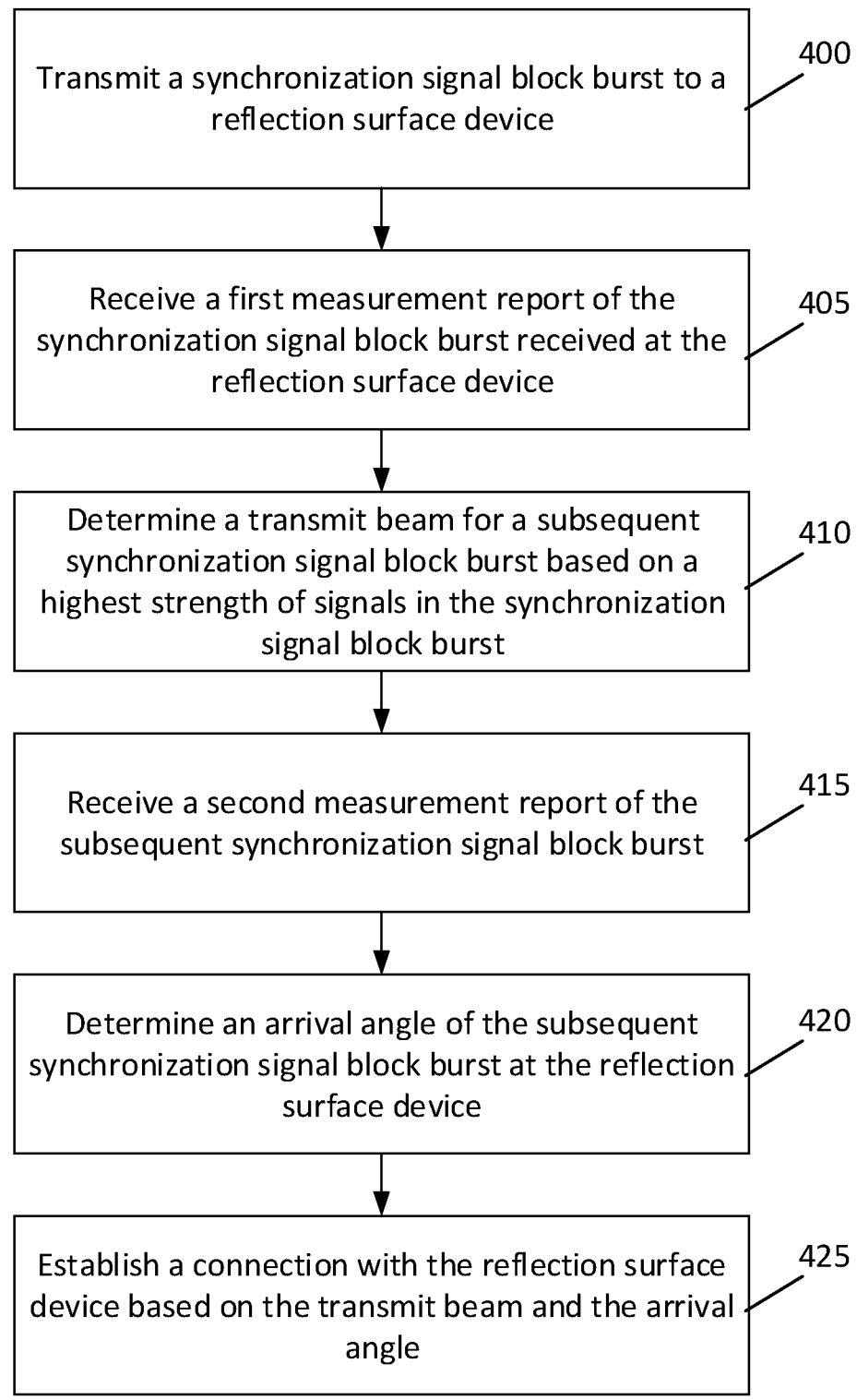
FIG. 14 illustrates an example flow diagram of another method, according to certain example embodiments.

FIG. 14 illustrates an example flow diagram of another method, according to certain example embodiments. In an example embodiment, the method of FIG. 14 may be performed by a network entity, network node, or a group of multiple network elements in a 3GPP system, such as LTE or 5G-NR. For instance, in an example embodiment, the method of FIG. 14 may be performed by a BS or gNB, for instance, similar to apparatuses 10 or 20 illustrated in FIGS. 16(a) and 16(b).

According to certain example embodiments, the method of FIG. 14 may include, at 400, transmitting a synchronization signal block burst to a reflection surface device. At 405, the method may include receiving a first measurement report of the synchronization signal block burst received at the reflection surface device. At 410, the method may include determining a transmit beam for a subsequent synchronization signal block burst based on a highest strength of signals in the synchronization signal block burst. At 415, the method may include receiving a second measurement report of the subsequent synchronization signal block burst. At 420, the method may include determining an arrival angle of the subsequent synchronization signal block burst at the reflection surface device. At 425, the method may include establishing a connection with the reflection surface device based on the transmit beam and the arrival angle.

According to certain example embodiments, the method may also include transmitting phase shift settings on a control and feedback path to the reflection surface device. According to some example embodiments, each phase shift setting of the phase shift settings may be associated with one pair of arrival angles at the reflection surface device, and one pair of departure angles from the reflection surface device. According to other example embodiments, the pair of departure angles may remain the same for the subsequent synchronization signal block burst. In certain example embodiments, the pair of arrival angles may be different for the subsequent synchronization signal block burst. In some example embodiments, the method may also include applying a different spatial filter over each synchronization signal block in the synchronization signal block burst. In other example embodiments, the method may further include determining a pair of departure angles for a user equipment by sweeping phase shift settings from a second set of phase shift settings.

Figure 15:
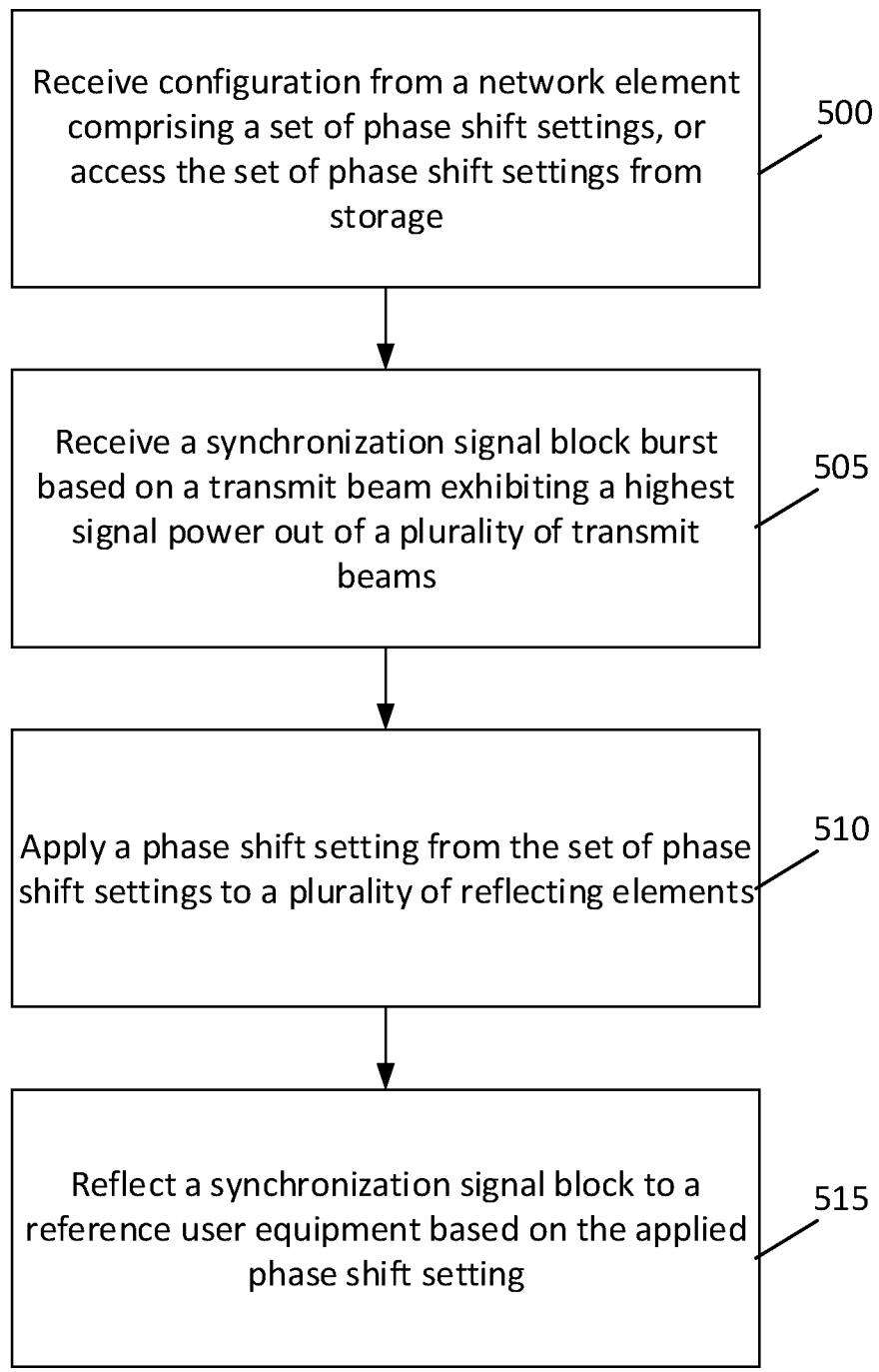
FIG. 15 illustrates an example flow diagram of a further method, according to certain example embodiments.

FIG. 15 illustrates an example flow diagram of a further method, according to certain example embodiments. In an example embodiment, the method of FIG. 15 may be performed by a network entity, network node, or a group of multiple network elements in a 3GPP system, such as LTE or 5G-NR. For instance, in an example embodiment, the method of FIG. 15 may be performed by an IRS, for instance, similar to apparatuses 10 or 20 illustrated in FIGS. 16(a) and 16(b).

According to certain example embodiments, the method of FIG. 15 may include, at 500, receiving configuration from a network element comprising a set of phase shift settings, or access the set of phase shift settings from storage. At 505, the method may include receiving a synchronization signal block burst based on a transmit beam exhibiting a highest signal power out of a plurality of transmit beams. At 510, the method may include applying a phase shift setting from the set of phase shift settings to a plurality of reflecting elements. At 515, the method may include reflecting a synchronization signal block to a reference user equipment based on the applied phase shift setting.

According to certain example embodiments, the set of phase shift settings is based on a pre-designed codebook. According to other example embodiments, the method may include configuring the reflecting elements based on the phase shift setting so that each synchronization signal block in the synchronization signal block burst is reflected with a same pair of departure angles from the apparatus, and a different pair of arrival angles at the apparatus. In certain example embodiments, the method may further include transmitting a measurement report of a synchronization signal block to the network element. In some example embodiments, the method may also include determining a pair of departure angles for a second user equipment by sweeping phase shift settings from a second set of phase shift settings. In other example embodiments, the method may further include configuring the reflecting elements based on each phase shift setting from the second set of phase shift settings so that each synchronization signal block in a second synchronization signal block burst is reflected with a different pair of departure angles and a same pair of arrival angles.

Figure 16A:
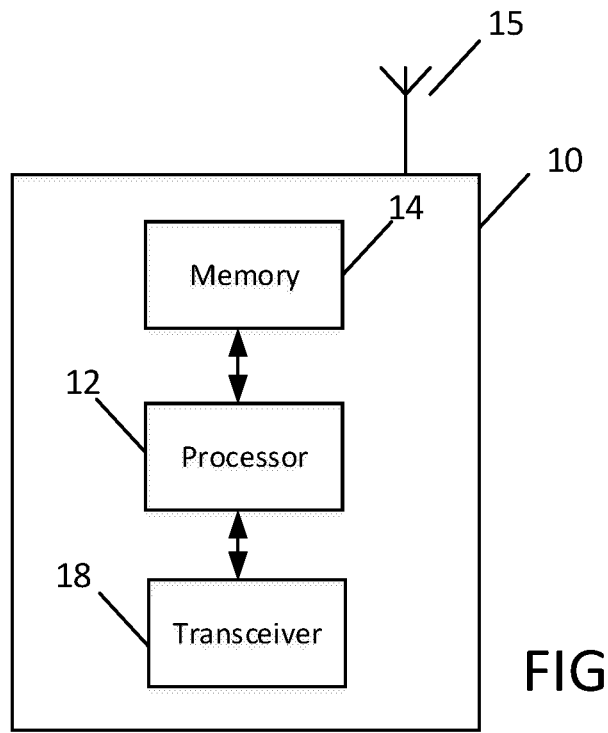
FIG. 16(a) illustrates an apparatus, according to certain example embodiments.

FIG. 16(a) illustrates an apparatus 10 according to certain example embodiments. In certain example embodiments, apparatus 10 may be a node or element in a communications network or associated with such a network, such as a UE or rUE (e.g., reference UE or target UE), mobile equipment (ME), mobile station, mobile device, stationary device, or other device. It should be noted that one of ordinary skill in the art would understand that apparatus 10 may include components or features not shown in FIG. 16(a).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 16(a).

As illustrated in the example of FIG. 16(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 16(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-13.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-13.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive a plurality of synchronization signal blocks comprising a synchronization signal block burst from a network element. Apparatus 10 may also be controlled by memory 14 and processor 12 to process a signal power measurement for each of the plurality of synchronization signal blocks. Apparatus 10 may further be controlled by memory 14 and processor 12 to transmit a report based on the signal power measurement to the network element.

Figure 16B:
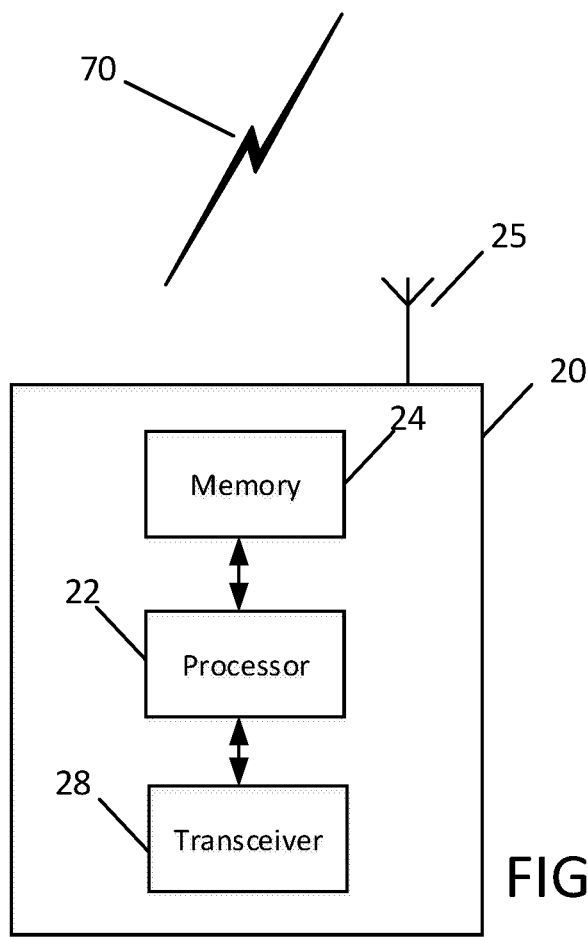
FIG. 16(b) illustrates another apparatus, according to certain example embodiments.

FIG. 16(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), NM, BS, IRS, and/or WLAN access point, associated with a radio access network (RAN), such as an LTE network, 5G or NR. It should be noted that one of ordinary skill in the art would understand that apparatus 20 may include components or features not shown in FIG. 16(b).

As illustrated in the example of FIG. 16(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 16(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-11, 14, and 15.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-11, 14, and 15.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In other example embodiments, apparatus 20 may be controlled by memory 24 and processor 22 to transmit a synchronization signal block burst to a reflection surface device. Apparatus 20 may also be controlled by memory 24 and processor 22 to receive a first measurement report of the synchronization signal block burst received at the reflection surface device. Apparatus 20 may further be controlled by memory 24 and processor 22 to determine a transmit beam for a subsequent synchronization signal block burst based on a highest strength of signals in the synchronization signal block burst. In addition, apparatus 20 may be controlled by memory 24 and processor 22 to receive a second measurement report of the subsequent synchronization signal block burst. Further, apparatus 20 may be controlled by memory 24 and processor 22 to determine an arrival angle of the subsequent synchronization signal block burst at the reflection surface device. Apparatus 20 may also be controlled by memory 24 and processor 22 to establish a connection with the reflection surface device based on the transmit beam and the arrival angle.

In other example embodiments, apparatus 20 may be controlled by memory 24 and processor 22 to receive configuration from a network element comprising a set of phase shift settings, or access the set of phase shift settings from storage. Apparatus 20 may also be controlled by memory 24 and processor 22 to receive a synchronization signal block burst based on a transmit beam exhibiting a highest signal power out of a plurality of transmit beams. Apparatus 20 may further be controlled by memory 24 and processor 22 to apply a phase shift setting from the set of phase shift settings to a plurality of reflecting elements. In addition, apparatus 20 may be controlled by memory 24 and processor 22 to reflect a synchronization signal block to a reference user equipment based on the applied phase shift setting.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations Certain example embodiments may be directed to an apparatus that includes means for performing any of the methods described herein including, for example, means for receiving a plurality of synchronization signal blocks comprising a synchronization signal block burst from a network element. The apparatus may also include means for processing a signal power measurement for each of the plurality of synchronization signal blocks. The apparatus may further include transmitting a report based on the signal power measurement to the network element.

Other example embodiments may be directed to an apparatus that includes means for transmitting a synchronization signal block burst to a reflection surface device. The apparatus may also include means for receiving a first measurement report of the synchronization signal block burst received at the reflection surface device. The apparatus may further include means for determining a transmit beam for a subsequent synchronization signal block burst based on a highest strength of signals in the synchronization signal block burst. In addition, the apparatus may include means for receiving a second measurement report of the subsequent synchronization signal block burst. Further, the apparatus may include means for determining an arrival angle of the subsequent synchronization signal block burst at the reflection surface device. The apparatus may also include means for establishing a connection with the reflection surface device based on the transmit beam and the arrival angle.

Other example embodiments may be directed to an apparatus that includes means for receiving configuration from a network element comprising a set of phase shift settings, or access the set of phase shift settings from storage. The apparatus may also include means for receiving a a synchronization signal block burst based on a transmit beam exhibiting a highest signal power out of a plurality of transmit beams. The apparatus may further include means for applying a phase shift setting from the set of phase shift settings to a plurality of reflecting elements. In addition, the apparatus may include reflecting a synchronization signal block to a reference user equipment based on the applied phase shift setting.

Certain example embodiments described herein provide several technical improvements, enhancements, and/or advantages. In some example embodiments, it may be possible to avoid using methods for searching beams, or manually setting up the beams. Certain example embodiments also provide low overhead, and enables the IRS to be automatically initialized once it is implemented into the current 5G NR system. In other example embodiments, it may be possible to determine the single best transmit beam and the corresponding best arrival angle. In addition, certain example embodiments may be extended to determine the best arrival angle for multiple transmit beams.

In other example embodiments, additional technical improvements may be the UE being able to be configured to perform and report measurements of direct or reflected beams for beam management or other purposes. This may provide the gNB information on whether the UE is blocked from the gNB or is able to receive direct transmissions. In the latter case, the gNB may optimize transmission parameters to enable the UE to receive joint transmissions on the direct link and the IRS-reflected link. Other example embodiments may provide means to deploy an IRS for coverage extension for existing UEs in a standards-transparent manner. This ability may be particularly advantageous for higher frequencies (e.g., FR2 and above).

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
BS Base Station
CRI CSI-RS Resource Indicator
CSI-RS Channel State Information Reference Signal
eNB Enhanced Node B
gNB 5G or Next Generation NodeB
IRS Intelligent Reflecting Surface
IRS-SSB IRS-Synchronization Signal Block
L1 Layer 1
LTE Long Term Evolution
MIB Master Information Block
NR New Radio
PRACH Physical Random Access Channel
RA Random Access
RACH Random Access Channel
RE Reflecting Element
RF Radio Frequency
RL Reference Link
RRC Radio Resource Control
RS Reference Signal
RSRP Reference Signals Received Power
SIB System Information Block
SSB Synchronization Signal Block
SSBRI Synchronization Signal Block Resource Indicator
rUE Reference User Equipment
UE User Equipment

We claim:

1. An apparatus, comprising:
at least one processor; and
at least one memory comprising computer program code,
the at least one memory and the computer program code
are configured, with the at least one processor, to cause
the apparatus at least to
transmit a synchronization signal block burst to a reflection surface device;
receive a first measurement report of the synchronization signal block burst received at the reflection surface device;
determine a transmit beam for a subsequent synchronization signal block burst based on a highest strength of signals in the synchronization signal block burst;
receive a second measurement report of the subsequent synchronization signal block burst;
determine an arrival angle of the subsequent synchronization signal block burst at the reflection surface device; and
establish a connection with the reflection surface device based on the transmit beam and the arrival angle.

2. The apparatus according to claim 1, wherein the at least one memory and the computer program code are further configured, with the at least one processor, to cause the apparatus at least to:
transmit phase shift settings on a control and feedback path to the reflection surface device.

3. The apparatus according to claim 1, wherein each phase shift setting of the phase shift settings are associated with one pair of arrival angles at the reflection surface device, and one pair of departure angles from the reflection surface device.

4. The apparatus according to claim 3:
wherein the pair of departure angles remain the same for the subsequent synchronization signal block burst, and wherein the pair of arrival angles is different for the subsequent synchronization signal block burst.

5. The apparatus according to claim 1, wherein the at least one memory and the computer program code are further configured, with the at least one processor, to cause the apparatus at least to:
apply a different spatial filter over each synchronization signal block in the synchronization signal block burst.

6. The apparatus according to claim 1, wherein the at least one memory and the computer program code are further configured, with the at least one processor, to cause the apparatus at least to:
determine a pair of departure angles for a user equipment by sweeping phase shift settings from a second set of phase shift settings.

7. An apparatus, comprising:
at least one processor; and
at least one memory comprising computer program code,
the at least one memory and the computer program code
are configured, with the at least one processor, to cause
the apparatus at least to
receive configuration from a network element comprising a set of phase shift settings, or access the set of phase shift settings from storage;
receive a synchronization signal block burst based on a transmit beam exhibiting a highest signal power out of a plurality of transmit beams;
apply a phase shift setting from the set of phase shift settings to a plurality of reflecting elements, wherein the phase shift setting is associated with a pair of angles of arrival and a pair of angles of departure; and
reflect a synchronization signal block based on the applied phase shift setting.

8. The apparatus according to claim 7, wherein the set of phase shift settings is based on a pre-designed codebook.

9. The apparatus according to claim 7, wherein the at least one memory and the computer program code are further configured, with the at least one processor, to cause the apparatus at least to:
configure the reflecting elements based on the phase shift setting so that each synchronization signal block in the synchronization signal block burst is reflected with a same pair of departure angles from the apparatus, and a different pair of arrival angles at the apparatus.

10. The apparatus according to claim 7, wherein the at least one memory and the computer program code are further configured, with the at least one processor, to cause the apparatus at least to:
transmit a measurement report of a synchronization signal block to the network element.

11. The apparatus according to claim 7, wherein the at least one memory and the computer program code are further configured, with the at least one processor, to cause the apparatus at least to:
determine a pair of departure angles for a second user equipment by sweeping phase shift settings from a second set of phase shift settings.

12. The apparatus according to claim 11, wherein the at least one memory and the computer program code are further configured, with the at least one processor, to cause the apparatus at least to:
configure the reflecting elements based on each phase shift setting from the second set of phase shift settings so that each synchronization signal block in a second synchronization signal block burst is reflected with a different pair of departure angles and a same pair of arrival angles.

13. A method, comprising:
- transmitting a synchronization signal block signal burst to a reflection surface device;
- receiving a first measurement report of the synchronization signal block signal burst received at the reflection surface device;
- determining a transmit beam for a subsequent synchronization signal block signal burst based on a highest strength of signals in the synchronization signal block signal burst;
- receiving a second measurement report of the subsequent synchronization signal block signal burst;
- determining an arrival angle of the subsequent synchronization signal block signal burst at the reflection surface device; and
- establishing a connection with the reflection surface device based on the transmit beam and the arrival angle.

14. The method according to claim 13, further comprising transmitting phase shift settings on a control and feedback path to the reflection surface device.

15. The method according to claim 13, wherein each phase shift setting of the phase shift settings are associated with one pair of arrival angles at the reflection surface device, and one pair of departure angles from the reflection surface device.

16. The method according to claim 15,
- wherein the pair of departure angles remain the same for the subsequent synchronization signal block burst, and
- wherein the pair of arrival angles is different for the subsequent synchronization signal block burst.

17. The method according to claim 13, further comprising:
- applying a different spatial filter over each synchronization signal block in the synchronization signal block burst.

18. The method according to claim 13, further comprising:
- determining a pair of departure angles for a user equipment by sweeping phase shift settings from a second set of phase shift settings.

19. The apparatus according to claim 7, wherein the apparatus is co-located with a reference user equipment.

20. The apparatus according to claim 19, wherein the at least one memory and the computer program code are configured, with the at least one processor, to cause the apparatus to be in communication with the reference user equipment via a wireless or wired interface.

21. The apparatus according to claim 7, wherein the at least one memory and the computer program code are configured, with the at least one processor, to cause the apparatus at least to reflect the synchronization signal block to a reference user equipment based on the applied phase shift setting.

* * * * *